United States Patent [19]

Klein

[11] Patent Number: 5,504,898

[45] Date of Patent: Apr. 2, 1996

[54] THREADED ENVIRONMENT FOR AS/400

[75] Inventor: Paul Klein, Thousand Oaks, Calif.

[73] Assignee: Candle Distributed Solutions, Inc., Santa Monica, Calif.

[21] Appl. No.: 261,795

[22] Filed: Jun. 20, 1994

[51] Int. Cl.$^6$ .................................................. G06F 9/40
[52] U.S. Cl. .................................. 395/650; 364/DIG. 1; 364/281.3
[58] Field of Search ..................................... 395/650, 700

[56] References Cited

U.S. PATENT DOCUMENTS

| | | | |
|---|---|---|---|
| 5,247,677 | 9/1993 | Welland et al. | 395/650 |
| 5,404,521 | 4/1995 | Murray | 395/650 |
| 5,421,014 | 5/1995 | Bucher | 395/650 |

*Primary Examiner*—Thomas M. Heckler
*Attorney, Agent, or Firm*—Merchant, Gould, Smith, Edell, Welter & Schmidt

[57] ABSTRACT

An AS/400 computer is provided with a threaded environment by using thread related batch jobs to accept thread tasks and individually apply them to specialized batch jobs that perform the tasks. Return data is applied by the thread related batch jobs to a common queue and the using application is caused to wait on the common queue, thereby overcoming the AS/400 limitation that an application can only wait on one queue at a time. The thread tasks are thereby performed asynchronously while the user application effectively waits on all such thread tasks by waiting on the common queue. The threaded environment maintains a pool of active thread related batch jobs and permits the cloning of new thread related batch jobs from existing thread related batch jobs to efficiently manage the thread pool.

4 Claims, 1 Drawing Sheet

THREADED ENVIRONMENT FOR AS/400

BACKGROUND OF THE INVENTION

1. Field of the Invention

This invention relates in general to data processing structures and techniques, and in particular to data processing techniques used with particular computer systems, such as the IBM AS/400 minicomputer, which are required to process task requests from an application in series, waiting for a response from one such task before beginning a second such task.

2. Description of the Prior Art

There is presently a large installed base of IBM minicomputers, particularly the AS/400 series, which are presently limited in their usefulness by their inability to provide a threaded environment for use by application programs. A threaded environment, for the purposes of the present invention, is one in which a plurality of computer programs—such as data collection program or subtask A and data collection program or subtask B—can conveniently perform work for the same user application in paralell, that is, at the same time.

In the AS/400 series, for example, application programs must wait only on one job at a time. That is, a user application such as a computer network monitoring system may be required to schedule work on subtask A to collect data and schedule work on subtask B to collect additional data. This set of operations may conveniently be implemented on a conventional IBM AS/400 operating platform by first scheduling the data collection task on batch job A performing data collection subtask A and then, after the data is collected and returned by batch job A, scheduling the additional data collection task on batch job B. When the additional collection data is then made available to the user application, additional tasks may be scheduled and performed.

The described operations are said to be synchronous in that the batch jobs cannot interrupt other operations of the user application whenever convenient, but rather the user application waits for the results of the subtask or batch job to be presented to it before going on to perform other tasks. This identifies the major drawback to the non-threaded environment operations of the AS/400 because the user application must wait for the results of each batch job before proceeding to the next. In particular, the user application is not able to perform other tasks while batch job A is operating or while batch job B is operating. Similarly, since a user application must wait on one batch job before initiating another, batch job B cannot be operating while the user application is waiting for batch job A to be completed. The resultant waste of time that could otherwise be utilized if such tasks could be operated in parallel is substantial.

Other operating systems utilize a parallel task approach in which subtasks A and B are handled in parallel by different application threads both of which are able to communicate asynchronously with the user application that called them. That is, in a threaded environment the user application would be able to schedule work to be done by application thread A performing subtask A and then, without waiting for completion of subtask A, schedule work to be done by application B performing subtask B. Both application threads are able to communicate asynchronously with the calling user application so that subtasks A and B are performed in parallel while the user application may be otherwise occupied. When either application thread A or B has data available, it communicates with the user application by asynchronous interrupt so that the user application does not have to wait for the data before continuing.

In a situation in which the data from subtask A is required for the performance of subtask B, the lack of a threaded environment for the IBM AS/400 does not cause any substantial inefficiency because there would be no advantage to beginning the performance of subtask B until subtask A was completed. In such a situation, the restriction that the user application can only wait on one subtask at a time is not a substantial detriment. In most complex user applications, there are many subtasks that may advantageously be performed in parallel so that a threaded enhancement for the AS/400 would be extremely valuable.

In an attempt to provide at least some of the benefits of a threaded environment, a polling technique has been used in which the requester does not literally have to wait on only one subtask at a time. In a polling configuration, the user application communicates with batch job A requesting that data collection subtask A be performed. Instead of waiting on batch job A, the user application then communicates with batch job B requesting that data manipulation subtask B be performed. Several additional communications for task requests may also be performed if appropriate. As a result of the fact that a user application in the AS/400 environment may only wait on one batch job at a time, the user application would then normally have to wait on one such batch job until completed.

Using polling however, the user application then iteratively interrogates, or polls, each of the subtasks in some predetermined order to determine if that subtask has been completed. If a completed subtask is identified during polling, and a data transfer is required as a result of such completion, the data transfer may be accomplished or at least scheduled. Although this polling technique, in which the user application is responsible for checking with the subtasks to determine completion, is still a synchronous technique—the communications are controlled by the user application allowing subtasks to be performed in parallel which is an improvement in many situations over the more basic technique in which the user application has to wait for the synchronous communication from each subtask before proceeding to the next subtask.

Many limitations are still encountered with polling techniques, compared to the more optimal asynchronous techniques using threads in which the subtasks retain the responsibility for communicating completion information to the user application. One easy to describe limitation is that completion of a particular subtask cannot be communicated out of turn in a polling system. That is, even though a subtask has been completed and that completion could have been communicated to the user application in a threaded environment, the subtask does not have control of the timing of the completion communication and must wait until it reaches its turn during sequential polling. Additionally, application A must waste CPU resources caused by the polling which robs resources from other AS/400 tasks.

Although the AS/400 is capable of asynchronous operation in that individual user applications and batch jobs may operate in parallel as long as communications between them is not required, the substantial and fundamental modifications that would be necessary to add threaded environment capabilities to the AS/400 operating system would not be practical to implement except by IBM because of the substantial amount of software background information, that is code, which is maintained proprietary to IBM. Such modifications would probably be tantamount to a rewrite and replacement of the AS/400 operating system. Although IBM is believed to have attempted such modification, techniques for operating the AS/400 in a threaded environment are not presently publicly available.

What are needed are techniques for adding asynchronous, threaded environment abilities to the AS/400 that are compatible with the existing installed base of such computers.

SUMMARY OF THE INVENTION

In accordance with the present invention, an additional layer of tasks or jobs is provided between a conventional user application and a series of conventional, specialized batch jobs on which the user application may schedule work to be done in parallel, that is, in a manner simulating the behavior of asynchronous application threads. This additional layer is known herein as the thread enabling layer and includes a single application queue, called the common or API queue, on which the user application waits and to which all subtask outputs—or returns—are provided. Wherever data from any of the subtasks is placed on the API queue, the waiting user application wakes up and interrogates the queue to determine which subtask, or application thread, has produced the data and then the application retrieves the data.

The thread enabling layer includes one or more application programming interfaces, or APIs, which operate to apply job scheduling requests generated by the user application for each of a series of targeted, conventional batch jobs to each such target batch job. The API places the job scheduling request for each target batch job in the thread queue of a specialized thread job associated with that target batch job. The thread job's task is to modify the job scheduling request in its own queue for compatibility with the target job task and place the modified request in a target queue associated with each such target batch job. It is important to note that the user application is not required to wait on the API—or on any of the batch jobs—because the user application does not require notification of completion of any such batch job or the direct return of data therefrom.

When any of the target batch jobs has job completion information or data to be communicated with the user application, such information or data may immediately be placed on the common or API queue. When the user application has placed all task requests by means of the API, the user application issues a read request to the API queue and waits on the queue until awakened by data applied to the queue by one or more of target batch jobs.

In this manner, the thread enabling layer serves as an effectively asynchronous interface between an user application and a series of specialized, target batch jobs whose behavior with regard to the user application has been made to simulate the behavior of a series of application threads.

In another aspect, the present invention provides a method of operating an AS/400 computer system to emulate a threaded environment by applying asynchronous thread tasks as inputs to thread related batch jobs, operating the thread related batch jobs to perform the thread tasks and apply the return data to a single, common queue and causing the application to wait on the common queue to sequentially retrieve the return data from each of the thread tasks.

These and other features and advantages of this invention will become further apparent from the detailed description that follows which is accompanied by drawing figures. In the figures and description, reference numerals indicate various features of the invention, like numerals referring to like features throughout both the drawing figures and the description.

DETAILED DESCRIPTION OF THE PREFERRED EMBODIMENT(S)

Figure 1:
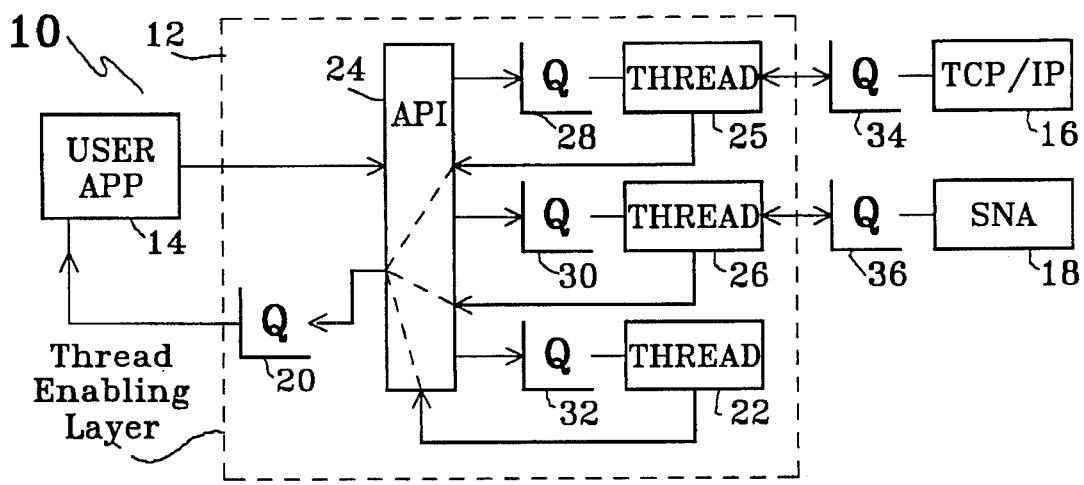
FIG. 1 is a block diagram schematic of a portion of an AS/400 system using a thread enabling layer between a user application and a series of target batch jobs made to appear to the user application to behave as asynchronous applications threads for the user application.

In FIG. 1, a block diagram schematic of a portion of AS/400 computer system 10 is shown using thread enabling layer 12 between user application 14 and a plurality of target batch jobs, such as target batch jobs 16 and 18 made to appear to user application 14 to behave as asynchronous applications threads. User application 14 may be any user application running on AS/400 computer system 10 that would benefit from operation in a threaded environment, such as a network performance monitoring system, which requires services from a series of batch jobs at about the same time. Typical specialized batch jobs include TCP/IP communications batch job 16 providing network transport for collecting data from a remote site in a computer network not shown and data processing batch job 18 which may use data manipulation facilities local to AS/400 computer system 10.

The modifications to AS/400 computer system 10 to permit the use of actual or simulated threads could be made at the hardware, microcode, operating system or applications level of the hardware software complex which forms the computer system. In accordance with the present invention, however, a threaded environment is created within AS/400 computer system 10 by modification only of the application layer of the hardware software complex.

These modifications are visible primarily in thread enabling layer 12 which includes a conventional queue using native AS/400 facilities to form common or API queue 20 for collecting data for user application 14. After user application 14 has distributed all necessary requests for service to batch jobs—such as target batch jobs 16 and 18, as well as target thread jobs to be described below— user application 14 issues a read request to API queue 20. Issuance of the read request puts user application 14 into a waiting state until data becomes available in API queue 20, from any of the batch jobs, at which time it is immediately made available to user application 14.

While user application 14 is in a wait for data on API queue 20, work requests are being processed by all target batch jobs such as target batch jobs 16 and 18 as well as target thread job 22. All such jobs received their work requests from user application 14 via appropriate application programming interface software typically included within user application 14, such as API 24, shown for convenience as part of thread enabling layer 12. Each such job request is applied to a selected thread job, such as thread jobs 25 and 26 or target thread job 22, by placing the request on a thread queue, such as thread queues 28, 30 and 32, respectively.

Simple tasks, like the task of computing pi to 20 decimal places, may be handled by a thread job directly using the computational or other facilities available to conventional batch jobs native to AS/400 computer system 10. Such thread jobs are described herein as target thread jobs to indicate that the services of another dedicated batch job are not required. Target thread job 22 is an example of a thread job which, in accordance with the task it is requested to perform such as the calculation of pi, does not need to interact with another batch job outside of thread enabling layer 12.

More complex tasks such as communicating with a remote network site using TCP/IP protocol, for example, are handled by specific dedicated batch jobs such as target batch jobs 16 and 18. Each thread job communicates with the selected targeted batch job through a target batch job queue such as target batch job queues 34 and 36 associated with target batch jobs 16 and 18, respectively. Target batch job queues 34 and 36 are each owned by their respective batch jobs and are therefore not easily able to be made to communicate with API queue 20 without the intervention of thread enabling layer 12.

Some major operating systems, such as the IBM MVS operating system and the UNIX operating system, have asynchronous facilities built into the operating system. Many such operating systems have been made to be compatible with industry standards such as the POSIX standard which, among other standards, includes standards for asynchronous communications. In this way, both MVS and UNIX have at least potentially compatible asynchronous facilities because both are POSIX compatible making applications which are consistent with such standards more readily portable between operating systems. It is therefore a substantial advantage to implement the above described threaded environment simulation in AS/400 computer system 10 in a manner which is also POSIX compatible. Thread jobs 25 and 26 are used to make target batch jobs 16 and 18 POSIX compatible by implementing communications with the target batch jobs using at least a subset of the POSIX interface rules. Data received by thread queues 28, 30 and 32 is applied to API queue 20 via API 24.

In general, therefore, thread jobs are required to provide four major services. First, thread jobs must listen to their own queues, that is, thread jobs 25, 26 and 22 must each be responsive to data and instructions placed on thread queues 28, 30 and 32, respectively. Second, thread jobs must operate on requests articulated in accordance with the appropriate interface standard, that is, in accordance with a preferred embodiment of the present invention, each thread job such as thread job 25 must accept input from API 24 through thread queue 28 in a POSIX compatible format and convert or reformat the task as necessary for the target batch job so that the data provided by the target batch job is also in a POSIX compatible format. In this way, target batch job 16 appears to user application 14 to be compatible the POSIX standard so that user application 14 is more easily transportable to other platforms many of which, unlike AS/400 computer systems, provide native asynchronous thread facilities.

A third task required of thread job 25 is to execute the work request by applying the modified and now POSIX compatible version of the work request unto target batch job queue 34 of target batch job 16. The fourth and final task required of thread job 25 is to cause the response from target batch job 16, such as an indication of completion and/or output data, to be applied to API queue 20 for eventual retrieval by user application 14.

In operation, API 24 of user application 14 applies a request for action by target batch job 16 to thread queue 28. Thread job 25, like all other batch jobs in the AS/400 environment, is able to listen to only one queue at a time. Thread job 25 waits on thread queue 28 until the request for action for target batch job 16 is received. Thread job 25 serves to convey this request to target batch job queue 34 and then waits on target batch job queue 34. Target batch job 16 waits on target batch job queue 34 until the request is applied to target batch job 16 after which the intended activity is performed. The output data or other return is then applied by target batch job 16 to target batch job queue 34 on which thread job 25 is waiting. Thread job 25 then returns the output data to API queue 20 via API 24.

In this sequence of events, user application 14 is required to wait only on a single, common queue, while thread job 25 is only required to wait on one queue at a time starting with thread queue 28, thereafter waiting on target batch job queue 34 and thereafter applying data to API queue 20. Target batch job 16 and target batch job queue 34 which would typically be supplied therewith, is outside of thread enabling layer 12 and does not know of its operation. Target batch job 16 therefore is only required in accordance with a conventional AS/400 environment to wait on one queue, target batch job queue 34.

After applying the request to thread queue 28, user application 14 is not required to wait on any queue and therefore can take other actions. For example, API 24 of user application 14 may then apply a request for action by target batch job 18 to thread queue 30. Thread job 26, is also able to listen to only one queue at a time and waits on thread queue 30 until the request for action for target batch job 18 is received. Thread job 26 conveys the request to target batch job queue 36 and then waits for a response therefrom. Target batch job 18 waits on target batch job queue 36 until the request is applied to target batch job 18 after which the intended activity is performed. The output data or other return is then applied by target batch job 18 to target batch job queue 36 on which thread job 26 is waiting. Thread job 26 then returns the output data to API queue 20 via API 24.

During this set of transactions, as in the previous set of transactions related to target batch job 18, no threads are required to wait on more than one queue at a time. In addition, user application 14 is not required to wait on any queue and therefore can take other actions such as with regard to sending work to target thread job 22 via thread queue 32 before beginning to wait on API queue 20.

After user application 14 has completed all such transactions for sending work out to batch jobs, user application 14 then waits on API queue 20. However, while waiting on API queue 20, user application 14 is actually waiting on data from the sources that apply data to API queue 20 including thread queues 28, 30 and 32. In accordance with the present invention, user application 14 while waiting only one queue as required by the AS/400 environment is effectively waiting on data from queues associated with a plurality of threads in the same manner as a conventional threaded environment.

Figure 2:
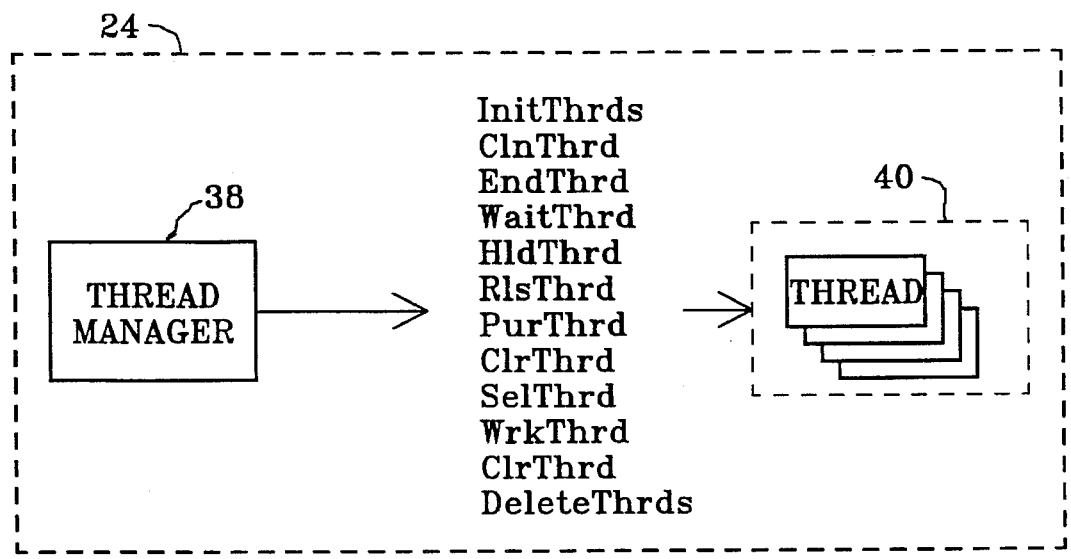
FIG. 2 is an illustration of a thread job pool in accordance with the present invention.

Referring now to FIG. 2, threads such as thread jobs 22, 25 and 22 are conventional AS/400 batch jobs created by API 24 using native batch job facilities. Although such thread jobs may be created one at a time by API when needed, a substantial reduction of overhead may be achieved in accordance with a further aspect of the present invention by using a thread pool with clonable threads. API 24 includes thread manager 38 which, when enabled, creates and maintains thread pool 40. Thread pool 40 comprises one or more conventional AS/400 batch jobs setup for use in the present invention to provide the simulation of threads. The primary difference between the threads in thread pool 40 and other AS/400 batch jobs is that although such batch jobs are typically totally independent of each other, the threads in thread pool 40 are tied together to be made aware of each other. The threads in pool 40 are coded in C or any other convenient language and are main entry points for the program.

The use of a centralized thread manager 38 serves to substantially reduce the computational overhead associated with the maintenance of thread pool 40 by allowing API 24 to send work directly to thread pool 40 without having to handle thread management. In particular, thread manager 38 initially creates at least one thread that can be cloned automatically to create additional threads when needed without the intervention of API 24.

Assuming a simplified case in which all threads are alike, only a single thread need be created at initialization. When another thread is needed, thread pool 40 is polled to determine if a thread is available. If not, an API, such as the ClnThrd API described below, is called to clone a new thread which is then an exact duplicate of the original thread.

Additional thread pool maintenance activities can also be performed by thread manager 38, as will be described below with regard to one specific embodiment of the present invention. The following description explains several of the features of this type available from individual APIs within user application 14, typically within thread manager 38.

Synchronization between user application 14 and any particular thread is handled using a notify concept. When thread manager 38 issues a CrtThrd API to create a thread, a WaitThrd API is used to synchronize the application and the thread. Only then can work be scheduled to the thread. An application that has scheduled work to a thread can either wait for the thread to finish the work or the application can continue to work in parallel with the thread. As noted above, the application can even schedule more work with another thread.

A major limitation in an AS/400 environment is that an application cannot directly wait on more than one thread at a time. In accordance with the present invention, however, an application can be allowed to effectively wait on a plurality of threads by waiting on a single queue such as API queue 20 which is served by a plurality of threads.

Work scheduled to a thread executes immediately if the thread is idle. When a thread is busy, work is queued automatically until the thread enters the idle state. Then the request is pulled of the queue. For example, if thread job 25 is busy when called by API 24, such as the WrkThrd API described below, the work to be scheduled on thread job 25 is held on thread queue 28 until thread job 25 becomes idle and is therefore instructed to begin waiting on thread queue 28 again. As soon as thread job 25 begins to wait on thread queue 28, the work to be scheduled on thread job 25 is read by thread job 25 from thread queue 28.

Threads can be pooled into groups that have similar attributes, such as: subsystem, priority, user profile, current library and security. A thread can be selected by its attribute as well as its name so that user application 14 is not required to know profiles, current library and subsystem names when making thread selections. User application 14 only needs to know thread names such as PCYTHD, SITTHD or ACTTHD thread. Thread pool 40 can contain one or more of each type of these threads.

If all threads in thread pool 40 are busy, user application 14 can clone a new thread from an existing thread in thread pool 40. This is a very useful and powerful tool because user application 14 can recreate any required thread, such as a PCYTHD, SITTHD or ACTTHD thread without knowing their attributes, just their names. When user application 14 selects a thread name to be cloned, the attributes of an existing thread with the same name are copied by thread manager 38 to a new, cloned thread with the same name. For example, user application 14 can clone a new PCTTHD from an active PCYTHD.

Threads are created to have a limited life-span in their idle state. If the idle state life-span threshold is exceeded for any particular thread, that thread will self terminate without having to provide notification to user application 14. This limited life-span feature, known as time-out, may selectively be disabled on a thread by thread basis if desired. Use of cloning and time-out permits thread pool 40 to be self-managing in that user application 14 can freely clone new threads as demand requires to expand thread pool 40 while, as demand is reduced, the threads self terminate one by one to automatically reduce thread pool 40 and free additional computer resources.

Another enhancement of a basic thread pool is the use of symbolic names. When work is scheduled onto a thread, user application 14 can assign a symbolic name to the thread that attaches a relationship between the work being performed, that is the overall task, and the thread. Many threads can thereby be related to each other. Many APIs operate on relationships as well as threadnames so that great flexibility is provided because user application 14 can operate an API on many related threads at the same time. For example, an API that purges threads may be used by user application 14 to purge all threads that have a relationship to policy PCY1 without requiring user application 14 to know the thread names, attributes or even the number of threads involved.

When all threads in thread pool 40 are busy, and a single thread may be considered to be a thread pool of 1, thread manager 38 will select a thread at random from thread pool 40 and return the thread name to user application 14 in response to a request to select a thread in the form of a SelThrd API, described below in greater detail. User application 14 will then put a request for use of this thread on an appropriate thread queue such as thread queue 28, 30 or 32. If it becomes necessary to remove the request before execution by the thread is begun, user application 14 can use the ClrThrd API to empty the thread queue. User application 14 can not only remove all requests for a specific thread but also remove all requests associated with a specific relationship. To remove all work related to a specific process, the ClrThrd and PurThrd APIs can be used together.

When work is scheduled to a thread it is executed under the user profile specified on the WrkThrd API. Initially, the thread executes under its own user profile. When work is selected, a swap to the new user profile specified on the WrkThrd API is performed. When the thread work is completed, a swap returning the thread to its original user profile is performed. Notification of a failed swap is returned if the parameter *POST is specified while *NOPOST indicates that the work is to be performed under the thread's original user profile. The *POST parameter requires the insertion of *AUTH in the thread's parameter string. In order to swap to a new user profile as indicated in the WrkThrd API, the new profile must be enabled and be accessible with the level of security available to the thread it is being swapped to.

A thread recovers from abnormal termination of its thread work by discarding the work and entering the idle state. If work is queued for the thread, that work will then be pulled off the queue and executed. The Joblog associated with the thread which was abnormally terminated will contain the error description which will be returned to user application 14 if the *POST parameter was specified.

The thread APIs use constants starting with "*" as inputs to some of the parameters. These constants cannot be more than 10 characters in length and must be typical "C" language strings, that is, terminated with a NULL character.

The following is a list, and simple explanation, of many of the constants and parameters used in user application 14 in accordance with the present invention.

*AUTOSEL—This constant is used to indicate that a unique thread name is to be generated by thread manager 38, that is, the thread name is not being passed by the calling API. Unique thread names start with a character "Q" followed by a series of numbers.

*SAME—This constant is used to indicate that the old values for the parameter, to which this constant applied, should be retained.

*RECYCLE—This constant is used to indicate a complete purge of the old thread, followed by a restart of a thread, is to occur before the related API function is to take affect. It is used in the ClnThrd API used to clone threads.

*THRD—This constant specifies that the type of input to the API is to be a simple thread ID.

*RELATION—This constant specifies the type of input to the API is to be a relationship and refers to all busy threads that have the same relationship. Relationships are defined by the "Relation" parameter of the WrkThrd API, described below.

*POST—This constant indicates that the API is to notify the caller when the scheduled work is complete. The application issues the WaitThrd API to wait for the work to complete. Note: CrtThrd always notifies the application and the application must always issue a WaitThrd when using that API!

*NOPOST—This constant signals the API not to notify the caller when the specified work is complete.

*WORK—This constant specifies that the WAIT is for thread work, that is, the WrkThrd API, rather than thread initialization or termination. Thread initialization or termination would use the *THRD constant on the WaitThrd API.

WaitTime—This parameter specifies the number of seconds to wait for a thread to complete its work, as follows:

0=Never wait,

−1=Wait forever, n=number of seconds to wait.

Lib—This parameter specifies the name of the AS/400 library where the thread environment is to reside. The Library name is 10 characters or less.

ThreadName—This parameter specifies the name given to a thread, that is, it specifies the name of the batch job that will perform the function of the thread. This name is 10 characters or less.

ThrdID—This parameter provides the name of the thread selected, created or cloned. This must be an 11 character output field, including one space for the NULL terminator.

Type—This input parameter specifies a relationship to one or more threads, or indicates a specific thread, using the "*THRD" and "*RELATION" constants. This parameter must be 10 characters or less.

UserPrf—This parameter indicates the name of the user profile to be used by the thread while it is doing work. This parameter must be 10 characters or less.

PgmObj—This input parameter defines the name of a CL command, or a program object, that the thread will act on. This parameter must be 10 characters or less.

Parm—This parameter specifies the program parameter to be passed to the thread. In some cases this parameter is "*NONE" and must remain like that. This can be any length and NULL terminated.

Curlib—This parameter specifies the name to use for the current library of a thread. This parameter must be 10 characters or less.

Attr—This parameter is used to define the attributes of the thread. It can be any name up to 10 characters. Attributes starting with "*PRI" specify private threads and will not be selectable when using the SelThrd API.

JOBQ—This parameter provides the name of the jobq that the thread job is submitted to in the format, "LIB/JOBQNAME". This parameter must be 21 characters or less.

JOBD—This parameter provides the name of the jobd description that describes the thread job in the format, "LIB\JOBDNAME". This parameter must be 21 characters or less.

Related—This parameter provides the name of a relationship given to one or more threads during their execution of work. This parameter must be 32 characters or less.

Referring now again to FIG. 2, API 24 represents the series of APIs used to operate thread enabling layer 12. The primary APIs required for this operation include the Init-Threads, CrtThrd, EndThrd, WaitThr, HldThrd, RlsThrd, PurThrd, ClrThrd, SelThrd, WrkThrd, ClnThrd, and DeleteThrds APIs, each described below in greater detail.

Initialize Thread Environment API, InitThreads

Before any thread APIs can be used, the InitThrds API must be called to set up the threads environment in the specified library. All APIs after this one will then refer to this specified library. The standard format for use of this API follows:

```
InitThreads( Lib,
             Parm,
             "*NONE"
           );                    (1)
```

Any pre-existing threads environment will be destroyed, and any existing partial or damaged environment will be cleaned up and recreated, when the InitThrds API is called. The constant "*NONE" is required as the parm parameter. Objects will be created in the library specified. In most cases this library should not be a production library since the application may not be authorized to create objects in it. The library named QTEMP should not be specified because it will not work for the threads environment. Similarly, data queues that start with "Q#" cannot be used in this library because this naming convention is reserved for threads.

The following Return Codes result from a call to the InitThrds API:

0—OK

1—An object failed to create in library

2—Thread UserSpc failed to create in library

Create Thread API, CrtThrd

Applications create threads to schedule asynchronous work on its behalf. Threads execute as batch jobs and can be created into any subsystem and under any user profile. Once a thread is created, other thread APIs can be used to control it. The standard format for use of this API follows:

```
CrtThrd( Lib,
        ThreadName,
        Name
           "*AUTOSEL"
        Parm,
           "*NONE"
        Attr,
        JobD,
        JobQ,
        Userprf,
        Curlib,
        ThdId);                          (2)
```

A thread job is submitted as a batch job into the proper job queue and subsystem. If the *AUTOSEL constant is specified, the thread environment will assign a generated name to the job. ThdId contains the name of the batch job, and therefore the name of the thread, however that name is selected.

Since the thread is in reality an AS/400 batch job, it will take a short period of time to go through job creation. After the thread job is initialized, a notification is sent to the application signaling that it is ready to process work requests. At this point the thread has entered an idle state. The application must listen for the notification using the WaitThrd API with *THRD specified.

The user profile passed to this API must be enabled and have a password associated with it. CrtThrd does not need to know the password, only that a password exists for this thread.

The following Return Codes result from a call to the CrtThrd API:

0—OK
1—Thread name is already being used
2—Thread data queue failed to create
3—Thread job failed to submit

End Thread API, EndThrd

An application terminates an idle thread by using the EndThrd API. If the thread is busy, the termination will not occur until the work on the thread ends and the thread enters an idle state. The standard format for use of this API follows:

```
EndThrd( Lib,
        ThreadName,
        Type,
           "*THRD"
           "*RELATION"
        );                               (3)
```

When the Type parameter is *THRD, the thread name must be specified. The specific thread with this name is located and signaled to end. When *RELATION is specified, all busy threads, that is all threads not in an idle state, will be located who match this relation. They all will be signaled to end when their work is complete.

The request to end the thread is placed on the same queue that queued work is also on. That is, an EndThrd API call for thread job 25 would be placed on thread queue 28. Any work for thread job 25 already on thread queue 28 when the request to end is placed on the queue will be done before the request to end is placed on thread job 25. Any work for thread job 25 placed on thread queue 28 behind the request to end will wait until a new thread is created with the same name.

The following Return Codes result from a call to the EndThrd API:

0—OK
1—Thread name not found

Wait on Thread API, WaitThrd

User application 14 issues the WaitThrd API when it wishes to wait for thread initialization, termination or work to complete on a thread before another action is taken. The standard format for use of this API follows:

```
WaitThrd( Lib,
         ThreadName,
         WaitTime,
            seconds
            0
            -1
         Type
            "*THRD"
            "*WORK"
         );                              (4)
```

The WaitThrd API must always be issued, specifying the *THRD constant for the Type parameter, after a CrtThrd API call. When using Endthrd, user application 14 may also conveniently issue the WaitThrd API specifying the *THRD constant for the Type parameter.

After WrkThrd is issued with the *POST option, the application should wait for the work to complete using the *WORK parameter. This indicates that the wait is for work to complete on the thread and not for thread initialization or termination. If *NOPOST is specified, then WaitThrd can÷t be issued for the thread.

The WaitThrd API puts user application 14 into a hard wait while waiting, for the duration of the time-out, for the required notification. Alternatively, the notification can be tested using a zero WaitTime and checking the return code at polled intervals. Waiting on more than one thread at a time is not supported by the AS/400, but can be simulated in part by user application 14 by using polling to sequentially check a series of threads, one at a time in a specified order.

The following Return Codes result from a call to the WaitThrd API:

0—OK
1—Wait exceeded time-out value
2—Thread work ended via an ESCAPE message
3—Thread USERPRF authorization problem

Mold Thread API, HldThrd

User application 14 can suspend work on a thread by calling the HldThrd API. The work being done will enter a wait state and stop using the AS/400 computer system 10 CPU. The work on the thread can later be resumed by issuing the RlsThrd API, described below. The standard format for use of this API follows:

```
HldThrd( Lib,
        ThreadName,
        Type
           "*THRD"
           "*RELATION"
        );                               (5)
```

When the *THRD constant is used for the Type parameter in a HldThrd API call, the thread name must be specified. The specific thread with this name is then located and signaled to be held. When *RELATION is specified, all threads not in the idle state will be located who match this relation and they will all be signaled to be held.

The following Return Codes result from a call to the HldThrd API:

0—OK

1—Thread not found

2—Thread could not be held

Release Thread API, RlsThrd

User application 14 can resume work on threads held by an HldThrd API call by using the RlsThrd API. Threads will resume where they left off as if they were never held. The standard format for use of this API follows:

```
RlsThrd( Lib,
        ThreadName,
        Type
          "*THRD"
          "*RELATION"
        );                                          (6)
```

When the *THRD constant is used for the Type parameter in a RlsThrd API call, the thread name must be specified. The specific thread with this name is located and signaled to be released. When *RELATION is specified, all busy threads will be located who match this relation and all will be signaled to be released.

The following Return Codes result from a call to the RlsThrd API:

0—OK

1—Thread not found

2—Thread could not be released

Purge Thread API, PurThrd

Any thread, whether busy or in an idle state, can be immediately terminated by calling the PurThrd API. Work on the purged thread is interrupted at once and the entire thread is purged from its subsystem. Any work queued for this thread will wait until a thread with the same name is restarted. The standard format for use of this API follows:

```
PurThrd( Lib,
        ThreadName,
        Type
          "*THRD"
          "*RELATION"
        );                                          (7)
```

When the *THRD constant is used for the Type parameter in PurThrd API call, the thread name must be specified. The specific thread with this name is located and signaled to be purged. When *RELATION is specified, all threads will be located who match this relation and all will be signaled to be released.

Since there may be work queued to this thread, user application 14 may purge all queued work by calling the ClrThrd API described below before purging the thread with the PurThrd API. The following Return Codes result from a call to the PurThrd API:

0—OK

1—Thread not found

2—Thread description failed to delete

Clear Thread Queue API, ClrThrd

User application 14 can clear the queue of waiting work scheduled to a thread by calling the ClrThrd API, if user application 14 has determined that no more work should be given to that thread. Once the queue is cleared, the thread will enter idle state after it finishes its current work. The standard format for use of this API follows:

```
ClrThrd( Lib,
        ThreadName,
        Type
          "*THRD"
          "*RELATION"
        );                                          (8)
```

When the *THRD constant is used for the Type parameter in a ClrThrd API call, the thread name must be specified. The specific thread with this name is then located and any work queued for this thread is cleared. When *RELATION is specified, all threads not in the idle state will be located who match this relation and any work queued for any of these threads will be cleared.

The following Return Codes result from a call to the ClrThrd API:

0—OK

1—Thread not found

2—Thread could not be held

Select a Thread for Work API, SelThrd

A thread can be selected from an active pool of threads, such as thread pool 40, based on the attribute given to the thread at creation time. Similarly, a thread can be selected based on both attribute and user profile. User application 14 is therefore not required to keep track of thread names, many of which may have come into existence before user application 14 started. The standard format for use of this API follows:

```
SelThrd( Lib,
        ThreadName,
        Attr,
        UserPrf,
        Name
          "*NONE"
        );                                          (9)
```

The SelThrd API cannot be used to locate threads created with an attribute that started with "*PRI" which indicates that the thread is private to the creator and is not to be used by anyone else. For threads that are not private, ThreadName will contain the name of the selected thread when located. If user profile is *NONE, only the thread attribute will be checked.

The following Return Codes result from a call to the SelThrd API:

0—Thread idle, request will be immediate

1—Thread busy, request will be queued

2—Thread not found

Schedule Work Onto Thread API, WrkThrd

User application 14 uses the WrkThrd API to schedule work onto a thread. The PgmObj parameter specifies the type of work to be scheduled which may by either an AS/400 CL command, *CMD, or an AS/400 program object, *PGM. Also, the work can be related to a symbolic name that helps identify it in other APIs. The standard format for use of this API follows:

```
WrkThrd( Lib,
        ThreadName,
        PgmObj,
        Parm,
        Type,
          "*CMD"
          "*PGM"
        Post,
          "*POST"
          "*NOPOST"
        Related,
        UserPrf
        );                                      (10)
```

If *POST is specified, a notification will be sent to user application 14 when the work is complete but user application 14 must use WaitThrd to get the notification. The user profile provided by user application 14 will be used by the thread to limit authorization of the work being executed. The thread starts off having total authorization to all objects. Before application work is executed, a swap is made to the new profile then the application work is started. When complete, a swap is made back to the threads initial authorization of all objects and the thread enters idle state until more work is requested. If the thread was unable to swap to the new user profile, and *POST was specified then, WaitThrd will return an authorization error return code. Then the PgmObj will be executed under the initial thread profile with *SECURITY, a blank and the original parm as the new parm. This allows the application thread program to recognize that an authorization problem exists.

The following Return Codes result from a call to the WrkThrd API:

0—OK
1—Thread not found

Clone a Thread API, ClnThrd

User application 14 can clone threads if an active thread of the same type is then available. Thread specifics of the new or cloned thread are adopted from the existing cloned-from thread. Less knowledge of the thread specific information such as, job descriptions, job queue information, current library and user profile is therefore required if a thread is cloned rather than created. The standard format for use of this API follows:

```
ClnThrd( Lib,
        ThreadName,
        Type,
          "*THRD"
          "*RELATION"
        NewThread,
          Name
          "*AUTOSEL"
          "*RECYCLE"
        ThdId,
        UserPrf,
          Name
          "*SAME"
        );                                      (11)
```

When the *THRD constant is used for the Type parameter in a HldThrd API call, the thread name must be specified.

The specific thread with this name is then located and signaled to be held. When *RELATION is specified, all threads not in the idle state will be located who match this relation and they will all be signaled to be held.

NewThread specifies how to determine the name to call the cloned thread. If *AUTOSEL is specified, the thread environment generates the thread name. If *RECYCLE is specified, the cloned-from thread is purged first and then recreated with the same name. In either event, the thread name is returned by an updated ThdId. A new user profile name can be specified for the cloned thread or the name used, by the cloned-from thread will be reused if the *SAME constant is used for the UserPrf parameter.

Delete Thread Environment, DeleteThrds

User application 14 can remove the thread environment from a library using the DeleteThrds API. All active threads will be terminated immediately and the environment terminates. The standard format for use of this API follows:

```
DeleteThreads( Lib,
              Parm,
                "*NONE"
              );                                (12)
```

All data queue objects starting with "Q#" will be deleted so that any queue to be preserved between thread environments must use a different type of name.

The following Return Code results from a call to the DeleteThrds API:

0—OK

The code necessary to implement a threaded environment for an AS/400 computer system may conveniently be prepared in the conventional C language. In a particular implementation, less than 2500 lines of code are used. In that implementation, the code is prepared in six separate modules, described below, and listed in an appendix, which can be found in the application file.

The file name of the first code module is Q1CH.C which is an Include File. Applications include this file so as to enable them to use AS/400 threads. The Q1CH.C file contains the definitions of all thread services that can be used by the application.

The file name of the second code module is Q1CHEAD.C which is also an Include File. This file is included in all non-application thread modules and provides the definition of all internal thread subroutines used by thread modules.

The file name of the third code module is Q1CLOCK.C. This module provides general locking services and could be replaced by conventional lock techniques, if required, which support Exclusive and Shared locks.

The file name of the fourth code module is Q1CSCHED.C which provides Thread Scheduling Services. This file is used to process the applications thread requests and schedule them for execution.

The file name of fifth code module is Q1CSPTHD.C which provides Thread Services Subroutines used to support thread scheduling.

The file name of the sixth module is Q1CTHRD.C which is the actual Thread Batch Job. This file is submitted by create thread services and performs the function of a thread.

Although one or more specific embodiments have been disclosed, it is well within the skill of a person of ordinary skill in this art to utilize the present invention in various other embodiments. It must therefore be noted that the scope of the invention is defined by the claims hereafter appended.

```
/****************************************************************/
/******                                                   *******/
/****    AS/400 Thread Services                            *****/
/***              Copyright 1994 Candle Corp.              ****/
/*      FILE NAME:      Q1CH.C                              */
/*      Language: C                                         */
/*      TYPE: Include File                                  */
/*      Comment: Applications include this file so as to enable them */
/*               to use AS/400 threads.  The following contains the  */
/*               definitions of all thread services that can be used */
/*               by the application.                        */
/***                                                       ****/
/*****                                                     ****/
/******                                                   ******/
/****************************************************************/ extern int WaitThrd    (char *Lib, char *JobName, int WaitTm,
                            char *Type);

extern int CrtThrd     (char    *Lib, char    *JobName,
                            char    *Parm,
                            char    *Speed,
                            char    *JobD,
                            char    *JobQ,
                            char    *User,
                            char    *Curlib,
                            char    *Thdid);

extern int InitThrds   (char *Lib, char    *Parm);
    extern int DeleteThrds (char *Lib, char    *Parm);
    extern int SelThrd     (char *Lib, char    *JobName, char *Speed,
                            char *UserPrf);
    extern int PurThrd     (char *Lib, char    *JobName, char *Type);
    extern int ClnThrd     (char *Lib, char    *JobName, char *Type,
                            char *NewName, char *NewUesr, char *Thdid);
    extern int HldThrd     (char *Lib, char    *JobName, char *Type);
    extern int RlsThrd     (char *Lib, char    *JobName, char *Type);
    extern int EndThrd     (char *Lib, char    *JobName, char *Type);
    extern int ClrThrd     (char *Lib, char    *JobName, char *Type);
    extern int WrkThrd     (char    *Lib, char    *Job,
                            char    *Pgm,
                            char    *Parm,
                            char    *Type,
                            char    *Post,
                            char    *Related, char *User);

/****************************************************************/
/******                                                   *******/
```

Appendix-1

```
/****    AS/400 Thread Services                                 *****/
/***                                                             ****/
/*       FILE NAME:      Q1CHEAD.C                                 */
/*       Language: C                                               */
/*       TYPE: Include File                                        */
/*       Comment: Included in all non-application thread modules.  */
/*                This provides the definition of all internal thread */
/*                subroutines used by thread modules.              */
/***                                                             ****/
/*****                                                           ****/
/******                                                         *****/
/******************************************************************/
#define   TARGETLIB       "QTHRD     "
#define   TARGETLIBSM     "QTHRD"
#define   PRIMQ           "Q1CNMSCHD"
#define   SECONDQ         "Q1CNMSCHDB"

#define   THRDPGM         "Q1CNMTHRD"
#define   THDPOSTQ        "Q1CNMPOST"
#define   THDMAXLEN       1024
#define   SPCNAMETHD      "Q1CNMTHRD"
#define   SCHEDULE        "Q1CNMSCHD "
#define   SPCTHDSIZE      100000
#define   SPCINIT         '®0'
#define   SPCHEADER       4
#define   SPCTHD          "Q1CNMTHRD "
#define   SPCLIBTHD       "Q1CNMTHRD QTHRD     "
#define   AS400NAMESZ     10
#define   AS400NUM        6
#define   AS400NUMSZ      6
#define   AS400USER       10
#define   AS400KEYSZ      16
#define   JOBUSRNUMSZ     26
define   MSGIDSZ         7 struct Thd_Table §
    char    ThdName[AS400NAMESZ];
    char    Job[AS400NAMESZ+1];
    char    User[AS400USER+1];
    char    Number[AS400NUM+1];
    char    JobKey[AS400KEYSZ];
    char    Speed[10+1];
    char    Busy;
    char    Related[32+1];
    †;

struct Thd_Work §
    char  Type;
    char  PgmName[AS400NAMESZ];
    char  Parm[256];
```

Appendix-2

```
    char    RspKey[NPTKEYSZ];
    char    Post[10+1];
    char    Related[32+1];
    char    User[10+1];
   } ;

struct Thd_Post {
    char    Status;
    char    Reserv[AS400NAMESZ-1];
    char    Reser2[NPTKEYSZ];
   } ;
#define     THRD_SUCCESS   0
#define     THRD_FAILED    1
define     THRD_SECURITY  3 extern int CheckObject  (char *name,
                         char *lib,
                         char *type,   char *msgid,
                         char *msgtxt, int *msgtxtsz);

extern int Lock         (char *Lib, char *, char *);
extern int UnLock       (char *Lib, char *, char *);
extern int WaitThrd     (char *Lib, char *JobName, int WaitTm,
                         char *Type);

extern int CrtThrd      (char    *Lib, char   *JobName,
                         char    *Parm,
                         char    *Speed,
                         char    *JobD,
                         char    *JobQ,
                         char    *User,
                         char    *Curlib,
                         char    *Thdid);

extern int InitThrds    (char *Lib, char    *Parm);
extern int DeleteThrds  (char *Lib, char    *Parm);
extern int SelThrd      (char *Lib, char    *JobName, char *Speed,
                         char *UserPrf);
extern int PurThrd      (char *Lib, char    *JobName, char *Type);
extern int ClnThrd      (char *Lib, char    *JobName, char *Type,
                         char *NewName, char *NewUesr, char *Thdid);
extern int HldThrd      (char *Lib, char    *JobName, char *Type);
extern int RlsThrd      (char *Lib, char    *JobName, char *Type);
extern int EndThrd      (char *Lib, char    *JobName, char *Type);
extern int ClrThrd      (char *Lib, char    *JobName, char *Type);
extern int WrkThrd      (char    *Lib, char    *Job,
                         char    *Pgm,
                         char    *Parm,
                         char    *Type,
                         char    *Post,
```

Appendix-3

```
                         char    *Related, char *User);
extern int FndThrdD     (char *Lib, struct Thd_Table THDREC);
extern int CrtThrdD     (char *Lib, struct Thd_Table THDREC);
extern int DltThrdD     (char *Lib, struct Thd_Table THDREC);
extern int ChgThrdD     (char *lib, struct Thd_Table THDREC);
extern int LocThrdD     (char *Lib, struct Thd_Table THDREC,
                         struct Thd_Table *THDREC2,
                         int     *SpcRow,
                         int     *SpcCount,
                         char    **SpcPtr,
                         char    *Option);
/******************************************************************/
/******                                                      ******/
/****    AS/400 Thread Services                               *****/
/***                                                           ****/
/*      FILE NAME:      Q1CLOCK.C                                */
/*      Language: C                                              */
/*      TYPE: Lock Services                                      */
/*      Comment: General locking services.  Can be replaced by   */
/*               other lock techniques if required.  Other       */
/*               techniques must support Exclusive and Shared    */
/*               locks.                                          */
/*                                                               */
/***                                                           ****/
/*****                                                         ****/
/******                                                      ******/
/******************************************************************/
#include _stdio.h¢              /* Standard I/O header          */
#include _stdlib.h¢             /* Standard library header      */
include _string.h¢             /* String handling utilities    */ include _opusapi.qattsysc¢     /* QUSRTOOL IBM supplied        */
include _opsyapi.qattsysc¢     /* QUSRTOOL IBM supplied        */
#include _opmhapi.qattsysc¢     /* QUSRTOOL IBM supplied        */

/*################################################################*/
/* Routine: Lock ...                                              */
/*################################################################*/
int Lock(char *Lib, char *Usrspc, char *Type)
 §
   int  rc;
   int  i,j,k;                  /* General loop counters        */
   char SysBuff[60];            /* General system buffer        */

/******************************************************************/
/* Lock the Userspace using a simple AS/400 lock service          */
/******************************************************************/
   memset(SysBuff,'®0',sizeof(SysBuff));
   sprintf(SysBuff,
```

Appendix-4

```
                    "Alcobj obj((%s/%s *USRSPC %s)) WAIT(32767)",
                                Lib,Usrspc,Type);

rc = system(SysBuff);

if (rc != 0)
      AbortMsg("Lock failed");
}
/*################################################################*/
/* Un-Lock the userspace using a simple AS/400 lock service       */
/*################################################################*/
int UnLock(char *Lib, char *Usrspc, char *Type)
{
   int  rc;
   int  i,j,k;                     /* General loop counters       */
   char SysBuff[60];               /* General system buffer       */

/*****************************************************************/
/* Un-Lock the userspace usijg a simple AS/400 lock service      */
/*****************************************************************/
   memset(SysBuff,'®0',sizeof(SysBuff));
   sprintf(SysBuff,
                  "Dlcobj obj((%s/%s *USRSPC %s)) ",
                                Lib, Usrspc,Type);

rc = system(SysBuff);

if (rc != 0)
      AbortMsg("UnLock failed");
}
/*****************************************************************/
/******                                                   *******/
/****   AS/400 Thread Services,                            *****/
/***                                                        ****/
/*      FILE NAME:        Q1CSCHED.C                          */
/*      Language: C                                           */
/*      TYPE: Thread Scheduling Services                      */
/*      Comment: Used to process the applications thread requests */
/*               and schedule them for execution.              */
/*                                                            */
/***                                                        ****/
/*****                                                     ****/
/******                                                   ******/
/*****************************************************************/
#include _stdio.h¢              /* Standard I/O header           */
#include _stdlib.h¢             /* Standard library header       */
include _string.h¢             /* String handling utilities     */ include _opusapi.qattsysc¢     /* QUSRTOOL IBM supplied         */
include _opsyapi.qattsysc¢     /* QUSRTOOL IBM supplied         */
```

Appendix-5

```
#include _opmhapi.qattsysc¢         /* QUSRTOOL IBM supplied        */
#include _qlchead.qcsrc¢            /* New model headers            */
/****************************************************************/
/* Module CrtThrd ...                                           */
/****************************************************************/
int CrtThrd(char *Lib,  char *Job, char *Parm, char *Speed,
            char *JobD, char *JobQ, char *User, char *Curlib,
            char *Thdid)
§
  int   i,j,k,rc;
  int   Msgtxtsz;                   /* Error API message size       */
  int   RetVal;
  int   SpcRow;
  int   SpcLeft;
  static int AutoCount = 0;
  long  Buffsz;

char Msgid[AS400MSGIDSZ];         /* Message from check API       */
  char Msgtxt[SPACE_TEXT_SIZE];     /* Returned message from API    */
  char JobKey[NPTKEYSZ+1];
  char JobKey2[AS400NAMESZ+1];      /* Unique key for DataQ access  */
  char Userid[AS400NAMESZ];         /* Userid of this job           */
  char JobName[26];
  char JobPrf[AS400NAMESZ];
  char SbmJob[1024];
  char Buffer[256];
  char Qbuff[256];
  char *SpcPtr;
  char AutoJob[AS400NAMESZ+1];

struct jobi0100 objparm;          /* IBM mapping structure        */
  struct Thd_Table THDREC;
  struct Thd_Table THDREC2;

memset(AutoJob,'®0',sizeof(AutoJob));
  memset(Thdid,'®0',AS400NAMESZ+1);
  strcat(AutoJob,Job);

if (strcmp(Job,"*AUTOSEL") == 00)
    §
     RetrieveUniqueJobId(JobKey2,Userid,Msgid,Msgtxt,&Msgtxtsz);
     JobKey2[7] = '®0';
     sprintf(AutoJob,"%d",AutoCount);
     strcat(JobKey2,AutoJob);
     memset(AutoJob,'®0',sizeof(AutoJob));
     strcat(AutoJob,JobKey2);
     memcpy(AutoJob,"Q#",2);
     AutoCount = AutoCount + 1;
    †
```

Appendix-6

```
memset(THDREC.ThdName,' ',AS400NAMESZ);
memcpy(THDREC.ThdName,AutoJob,strlen(AutoJob));
Lock(Lib,SPCNAMETHD,"*SHRRD");
rc = LocThrdD(Lib,THDREC,&THDREC2,&SpcRow,&SpcLeft,&SpcPtr,
              "*FRST");
UnLock(Lib,SPCNAMETHD,"*SHRRD");
if (rc == 00)
   return(1);

rc = CheckObject(AutoJob,Lib,"*DTAQ",Msgid,Msgtxt,&Msgtxtsz);
if (rc == 00)
   §
     ClearDataQueue(Lib,AutoJob);
   †
else
   §
     memset(Qbuff,'®0',sizeof(Qbuff));
     sprintf(Qbuff,
     "CRTDTAQ DTAQ(%s/%s) MAXLEN(%d) SEQ(*KEYED) KEYLEN(%d)",
     Lib,AutoJob,THDMAXLEN,NPTKEYSZ);
     rc = system(Qbuff);
     if (rc != 00)
        return(2);
   † memset(SbmJob,'®0',sizeof(SbmJob));                              _01
sprintf(SbmJob,                                                  _02
"SBMJOB CMD(CALL PGM(%s/%s) PARM('%s')) JOB(%s)      ®
 JOBD(%s) JOBQ(%s) USER(%s) CURLIB(%s) MSGQ(*NONE) OUTQ(*USRPRF) ®
 PRTDEV(*USRPRF) SRTSEQ(*USRPRF) ®
 LANGID(*USRPRF) CNTRYID(*USRPRF) CCSID(*USRPRF) ®
 INLLIBL(*CURRENT)",
 "NPTSTG",   /* Convert to QAUTOMON at build */
   THRDPGM,
   Speed,
   AutoJob,
   JobD,
   JobQ,
   User,
   Curlib);

if (system(SbmJob) != 00)
   §
    memset(Qbuff,'®0',sizeof(Qbuff));
    sprintf(Qbuff,
    "DLTDTAQ DTAQ(%s/%s)",
    Lib,AutoJob);
    system(Qbuff);
```

Appendix-7

```
       return(3);
     † strcat(Thdid,AutoJob);

return(0);

†
/****************************************************************/
/* Module EndThrd ...                                           */
/****************************************************************/
int EndThrd(char *Lib, char *Job, char *Type)
 §
   int   rc;
   int   i,j,k;
   int   Msgtxtsz;                 /* Error API message size     */
   int   RetVal;
   int   SpcRow;
   int   SpcLeft;
   long  Buffsz;

char Msgid[AS400MSGIDSZ];       /* Message from check API     */
   char Msgtxt[SPACE_TEXT_SIZE];   /* Returned message from API  */
   char JobKey[NPTKEYSZ+1];
   char Userid[AS400NAMESZ];       /* Userid of this job         */
   char JobName[26];
   char JobPrf[AS400NAMESZ];
   char SbmJob[256];
   char Buffer[256];

char *SpcPtr;

struct Thd_Work  THDWORK;
   struct Thd_Table THDREC;
   struct Thd_Table THDREC2;
   struct space_error err;         /* IBM API error structure    */
   struct space_error *errptr;     /* IBM API error structure    */ errptr = &err;
   err.space_error_size = SPACE_TEXT_SIZE;

if (strcmp(Type,"*THRD") == 00)
      §
       memset(THDREC.ThdName,' ',AS400NAMESZ);
       memcpy(THDREC.ThdName,Job,strlen(Job));
       Lock(Lib,SPCNAMETHD,"*SHRRD");
       rc = LocThrdD(Lib,THDREC,&THDREC2,&SpcRow,&SpcLeft,&SpcPtr,
                    "*FRST");
       UnLock(Lib,SPCNAMETHD,"*SHRRD");
```

Appendix-8

```
        if (rc != 00)
            return(1);

memset((char *)&THDWORK,' ',sizeof(THDWORK));
        THDWORK.Type = 'E';

SendToDataQueue(Lib,
                        SCHEDULE,
                        (char *)&THDWORK,
                        sizeof(THDWORK),
                        THDREC2.JobKey,
                        NPTKEYSZ);
        return(0);
        † if (strcmp(Type,"*RELATION") == 00)
        §
        memset(THDREC.ThdName,' ',AS400NAMESZ);
        memcpy(THDREC.ThdName,"*",1);
        Lock(Lib,SPCNAMETHD,"*SHRRD");
        rc = LocThrdD(Lib,THDREC,&THDREC2,&SpcRow,&SpcLeft,&SpcPtr,
                      "*FRST");
        while(rc == 00)
            §
            if (strcmp(THDREC2.Related,Job) == 00)
                §
                memset((char *)&THDWORK,' ',sizeof(THDWORK));
                THDWORK.Type = 'E';

SendToDataQueue(Lib,
                                SCHEDULE,
                                (char *)&THDWORK,
                                sizeof(THDWORK),
                                THDREC2.JobKey,
                                NPTKEYSZ);
                † rc = LocThrdD(Lib,THDREC,&THDREC2,&SpcRow,&SpcLeft,&SpcPtr,
                          "*NEXT");
            †

UnLock(Lib,SPCNAMETHD,"*SHRRD");
        return(0);

†

†

/******************************************************************/
```

Appendix-9

```
/* Module WrkThrd ...                                                 */
/*********************************************************************/ int WrkThrd(char *Lib, char *Job, char *Pgm, char *Parm, char *Type,
            char *Post,char *Related, char *User)
§
  int  rc;
  int  i,j,k;
  int  Msgtxtsz;              /* Error API message size       */
  int  RetVal;
  int  SpcRow;
  int  SpcLeft;
  long Buffsz;

char Msgid[AS400MSGIDSZ];        /* Message from check API      */
  char Msgtxt[SPACE_TEXT_SIZE];    /* Returned message from API   */
  char JobKey[NPTKEYSZ+1];
  char Userid[AS400NAMESZ+1];      /* Userid of this job          */
  char JobName[26];
  char JobPrf[AS400NAMESZ];
  char Buffer[256];
  char *SpcPtr;

struct Thd_Work  THDWORK;
  struct Thd_Table THDREC;
  struct Thd_Table THDREC2;
  struct space_error err;          /* IBM API error structure     */
  struct space_error *errptr;      /* IBM API error structure     */ errptr = &err;
  err.space_error_size = SPACE_TEXT_SIZE;
  memset(JobKey,' ',sizeof(JobKey));
  RetrieveUniqueJobId(JobKey,Userid,Msgid,Msgtxt,&Msgtxtsz);

memset(THDREC.ThdName,' ',AS400NAMESZ);
  memcpy(THDREC.ThdName,Job,strlen(Job));
  Lock(Lib,SPCNAMETHD,"*SHRRD");
  rc = LocThrdD(Lib,THDREC,&THDREC2,&SpcRow,&SpcLeft,&SpcPtr,
                "*FRST");
  UnLock(Lib,SPCNAMETHD,"*SHRRD");
  if (rc != 00)
     return(1);

memset((char *)&THDWORK,' ',sizeof(THDWORK));
  THDWORK.Type = ' ';
  if (memcmp(Type,"*PGM",4) == 00)
    THDWORK.Type = 'P';
  if (memcmp(Type,"*CMD",4) == 00)
    THDWORK.Type = 'C';
```

Appendix-10

```
    memset(THDWORK.PgmName,' ',AS400NAMESZ);
    memcpy(THDWORK.PgmName,Pgm,strlen(Pgm));
    memset(THDWORK.Parm,'®0',sizeof(THDWORK.Parm));
    memcpy(THDWORK.Parm,Parm,strlen(Parm));
    memcpy(THDWORK.RspKey,JobKey,NPTKEYSZ);
    memset(THDWORK.Post,'®0',sizeof(THDWORK.Post));
    strcat(THDWORK.Post,Post);
    memset(THDWORK.Related,'®0',sizeof(THDWORK.Related));
    strcat(THDWORK.Related,Related);
    memset(THDWORK.User,'®0',sizeof(THDWORK.User));
    strcat(THDWORK.User,User);

SendToDataQueue(Lib,
                    SCHEDULE,
                    (char *)&THDWORK,
                    sizeof(THDWORK),
                    THDREC2.JobKey,
                    NPTKEYSZ);

return(0);

†

/*****************************************************************/
/* Module HldThrd ...                                            */
/*****************************************************************/
int HldThrd(char *Lib, char *Job, char *Type)
 §
    int   rc;
    int   i,j,k;
    int   Msgtxtsz;                 /* Error API message size    */
    int   RetVal;
    int   SpcRow;
    int   SpcLeft;
    long  Buffsz;

char Msgid[AS400MSGIDSZ];       /* Message from check API    */
    char Msgtxt[SPACE_TEXT_SIZE];   /* Returned message from API */
    char JobKey[NPTKEYSZ+1];
    char Userid[AS400NAMESZ+1];     /* Userid of this job        */
    char JobName[26];
    char JobPrf[AS400NAMESZ];
    char SbmJob[256];
    char Buffer[256];
    char User[AS400NAMESZ+1];

char *SpcPtr;

struct Thd_Work  THDWORK;
    struct Thd_Table THDREC;
```

Appendix-11

```
struct Thd_Table THDREC2;
struct space_error err;         /* IBM API error structure    */
struct space_error *errptr;     /* IBM API error structure    */ errptr = &err;
err.space_error_size = SPACE_TEXT_SIZE;

if (strcmp(Type,"*THRD") == 00)
   §
    memset(THDREC.ThdName,' ',AS400NAMESZ);
    memcpy(THDREC.ThdName,Job,strlen(Job));
    Lock(Lib,SPCNAMETHD,"*SHRRD");
    rc = LocThrdD(Lib,THDREC,&THDREC2,&SpcRow,&SpcLeft,&SpcPtr,
                  "*FRST");
    UnLock(Lib,SPCNAMETHD,"*SHRRD");
    if (rc != 00)
       return(1);

memset(User,'®0',sizeof(User));
    for (i = 0; i _ AS400NAMESZ; ++i)
       §
         if (THDREC2.User[i] == ' ')
            break;
         User[i] = THDREC2.User[i];
       † memset(Buffer,'®0',sizeof(Buffer));
    sprintf(Buffer,"HLDJOB JOB(%s/%s/%s)",
            THDREC2.Number,
            User,
            THDREC2.Job);
    if (system(Buffer) != 00)
       return(2);

return(0);
   † if (strcmp(Type,"*RELATION") == 00)
   §
    memset(THDREC.ThdName,' ',AS400NAMESZ);
    memcpy(THDREC.ThdName,"*",1);
    Lock(Lib,SPCNAMETHD,"*SHRRD");
    rc = LocThrdD(Lib,THDREC,&THDREC2,&SpcRow,&SpcLeft,&SpcPtr,
                  "*FRST");
    while (rc == 00)
       §
         if (strcmp(THDREC2.Related,Job) == 00)
            §
```

Appendix-12

```
              memset(User,'®0',sizeof(User));
              for (i = 0; i _ AS400NAMESZ; ++i)
                {
                  if (THDREC2.User[i] == ' ')
                      break;
                  User[i] = THDREC2.User[i];
                } memset(Buffer,'®0',sizeof(Buffer));
              sprintf(Buffer,"HLDJOB JOB(%s/%s/%s)",
                      THDREC2.Number,
                      User,
                      THDREC2.Job);
              system(Buffer);

} rc = LocThrdD(Lib,THDREC,&THDREC2,&SpcRow,&SpcLeft,&SpcPtr,
                    "*NEXT");
         }

UnLock(Lib,SPCNAMETHD,"*SHRRD");

} return(0);
  }

/*******************************************************************/
/* Module RlsThrd ...                                              */
/*******************************************************************/
int RlsThrd(char *Lib, char *Job, char *Type)
  {
     int   rc;
     int   i,j,k;
     int   Msgtxtsz;                /* Error API message size     */
     int   RetVal;
     int   SpcRow;
     int   SpcLeft;
     long  Buffsz;

char  Msgid[AS400MSGIDSZ];     /* Message from check API     */
     char  Msgtxt[SPACE_TEXT_SIZE]; /* Returned message from API  */
     char  JobKey[NPTKEYSZ+1];
     char  Userid[AS400NAMESZ];     /* Userid of this job         */
     char  JobName[26];
     char  JobPrf[AS400NAMESZ];
     char  SbmJob[256];
     char  Buffer[256];
     char  User[AS400NAMESZ+1];
```

Appendix-13

```
char *SpcPtr;

struct Thd_Table THDREC;
struct Thd_Table THDREC2;
struct space_error err;          /* IBM API error structure   */
struct space_error *errptr;      /* IBM API error structure   */ errptr = &err;
err.space_error_size = SPACE_TEXT_SIZE;

if (strcmp(Type,"*THRD") == 00)
   §
   memset(THDREC.ThdName,' ',AS400NAMESZ);
   memcpy(THDREC.ThdName,Job,strlen(Job));
   Lock(Lib,SPCNAMETHD,"*SHRRD");
   rc = LocThrdD(Lib,THDREC,&THDREC2,&SpcRow,&SpcLeft,&SpcPtr,
                 "*FRST");
   UnLock(Lib,SPCNAMETHD,"*SHRRD");
   if (rc != 00)
      return(1);

memset(User,'®0',sizeof(User));
   for (i = 0; i _ AS400NAMESZ; ++i)
      §
      if (THDREC2.User[i] == ' ')
         break;
      User[i] = THDREC2.User[i];
      † memset(Buffer,'®0',sizeof(Buffer));
   sprintf(Buffer,"RLSJOB JOB(%s/%s/%s)",
           THDREC2.Number,
           User,
           THDREC2.Job);
   system(Buffer);

return(0);
   † if (strcmp(Type,"*RELATION") == 00)
   §
   memset(THDREC.ThdName,' ',AS400NAMESZ);
   memcpy(THDREC.ThdName,"*",1);
   Lock(Lib,SPCNAMETHD,"*SHRRD");
   rc = LocThrdD(Lib,THDREC,&THDREC2,&SpcRow,&SpcLeft,&SpcPtr,
                    "*FRST");

while (rc == 00)
      §
```

Appendix-14

```
              if (strcmp(THDREC2.Related,Job) == 00)
                 §
                   memset(User,'®0',sizeof(User));
                   for (i = 0; i _ AS400NAMESZ; ++i)
                      §
                        if (THDREC2.User[i] == ' ')
                           break;
                        User[i] = THDREC2.User[i];
                      † memset(Buffer,'®0',sizeof(Buffer));
                   sprintf(Buffer,"RLSJOB JOB(%s/%s/%s)",
                           THDREC2.Number,
                           User,
                           THDREC2.Job);
                   system(Buffer);

† rc = LocThrdD(Lib,THDREC,&THDREC2,&SpcRow,&SpcLeft,&SpcPtr,
                               "*NEXT");
              †

UnLock(Lib,SPCNAMETHD,"*SHRRD");

† return(0);

†

/*******************************************************************/
/* Module PurThrd ...                                              */
/*******************************************************************/
int PurThrd(char *Lib, char *Job, char *Type)
  §
    int  rc;
    int  i,j,k;
    int  Msgtxtsz;            /* Error API message size      */
    int  RetVal;
    int  SpcRow;
    int  SpcLeft;
    long Buffsz;

char Msgid[AS400MSGIDSZ];      /* Message from check API      */
    char Msgtxt[SPACE_TEXT_SIZE];  /* Returned message from API   */
    char JobKey[NPTKEYSZ+1];
    char Userid[AS400NAMESZ+1];    /* Userid of this job          */
    char JobName[26];
    char JobPrf[AS400NAMESZ];
```

Appendix-15

```
   char SbmJob[256];
   char Buffer[256];
   char User[AS400NAMESZ+1];

char *SpcPtr;

struct Thd_Table THDREC;
   struct Thd_Table THDREC2;
   struct space_error err;           /* IBM API error structure    */
   struct space_error *errptr;       /* IBM API error structure    */ errptr = &err;
   err.space_error_size = SPACE_TEXT_SIZE;

if (strcmp(Type,"*THRD") == 00)
      §
       memset(THDREC.ThdName,' ',AS400NAMESZ);
       memcpy(THDREC.ThdName,Job,strlen(Job));
       Lock(Lib,SPCNAMETHD,"*SHRRD");
       rc = LocThrdD(Lib,THDREC,&THDREC2,&SpcRow,&SpcLeft,&SpcPtr,
                     "*FRST");
       UnLock(Lib,SPCNAMETHD,"*SHRRD");
       if (rc != 00)
          return(1);

memset(User,'®0',sizeof(User));
       for (i = 0; i _ AS400NAMESZ; ++i)
          §
           if (THDREC2.User[i] == ' ')
               break;
           User[i] = THDREC2.User[i];
          † memset(Buffer,'®0',sizeof(Buffer));
       sprintf(Buffer,"ENDJOB JOB(%s/%s/%s) OPTION(*IMMED)",
               THDREC2.Number,
               User,
               THDREC2.Job);
       system(Buffer);

memset(Buffer,'®0',sizeof(Buffer));
       sprintf(Buffer,
               "DLTDTAQ DTAQ(%s/%s)",
               Lib,THDREC2.Job);

system(Buffer);
       Lock(Lib,SPCNAMETHD,"*SHRRD");
       rc = DltThrdD(Lib,THDREC2);
       UnLock(Lib,SPCNAMETHD,"*SHRRD");
       if (rc != 00)
```

Appendix-16

```
        return(2);

return(0);
    } if (strcmp(Type,"*RELATION") == 00)
    {
    memset(THDREC.ThdName,' ',AS400NAMESZ);
    memcpy(THDREC.ThdName,"*",1);
    Lock(Lib,SPCNAMETHD,"*SHRRD");
    rc = LocThrdD(Lib,THDREC,&THDREC2,&SpcRow,&SpcLeft,&SpcPtr,
                "*FRST");
    while (rc == 00)
        {
        if (strcmp(THDREC2.Related,Job) == 00)
            {
            memset(User,'®0',sizeof(User));
            for (i = 0; i _ AS400NAMESZ; ++i)
                {
                if (THDREC2.User[i] == ' ')
                    break;
                User[i] = THDREC2.User[i];
                } memset(Buffer,'®0',sizeof(Buffer));
            sprintf(Buffer,"ENDJOB JOB(%s/%s/%s) OPTION(*IMMED)",
                    THDREC2.Number,
                    User,
                    THDREC2.Job);
            system(Buffer);

memset(Buffer,'®0',sizeof(Buffer));
            sprintf(Buffer,
                    "DLTDTAQ DTAQ(%s/%s)",
                    Lib,THDREC2.Job);
            system(Buffer);
            DltThrdD(Lib,THDREC2);

} rc = LocThrdD(Lib,THDREC,&THDREC2,&SpcRow,&SpcLeft,&SpcPtr,
                    "*NEXT");
        }

UnLock(Lib,SPCNAMETHD,"*SHRRD");
    return(0);

}
```

Appendix-17

```
/***********************************************************************/
/* Module SelThrd ...                                                  */
/***********************************************************************/
int SelThrd(char *Lib, char *Job, char *Speed, char *UserPrf)
 §
    int   rc;
    int   Defer;
    int   i,j,k;
    int   Msgtxtsz;                 /* Error API message size         */
    int   RetVal;
    int   SpcRow;
    int   SpcLeft;
    int   Count;
    long  Buffsz;
    static unsigned long next = 1;
    static unsigned long Choice;

char Msgid[AS400MSGIDSZ];       /* Message from check API         */
    char Msgtxt[SPACE_TEXT_SIZE];   /* Returned message from API      */
    char JobKey[NPTKEYSZ+1];
    char Userid[AS400NAMESZ];       /* Userid of this job             */
    char JobName[26];
    char JobPrf[AS400NAMESZ];
    char SbmJob[256];
    char Buffer[256];
    char User[AS400NAMESZ];

char *SpcPtr;

struct Thd_Table THDREC;
    struct Thd_Table THDREC2;
    struct space_error err;         /* IBM API error structure        */
    struct space_error *errptr;     /* IBM API error structure        */ errptr = &err;
    err.space_error_size = SPACE_TEXT_SIZE;

Defer = 0;
    Count = 0;
    memset(THDREC.ThdName,' ',AS400NAMESZ);
    memcpy(THDREC.ThdName,"*",1);
    Lock(Lib,SPCNAMETHD,"*SHRRD");
    rc = LocThrdD(Lib,THDREC,&THDREC2,&SpcRow,&SpcLeft,&SpcPtr,
                  "*FRST");
    while (rc == 00)
       §
         if ( (strcmp(THDREC2.Speed,Speed) == 00) &&
              (memcmp(THDREC2.User,UserPrf,strlen(UserPrf)) == 00) &&
```

Appendix-18

```
                  (memcmp(THDREC2.Speed,"*PRI",4) != 00) )
                     Count = Count +1;

if ( (strcmp(THDREC2.Speed,Speed) == 00) &&
                  (strcmp(UserPrf,"*ANY") == 00) &&
                  (memcmp(THDREC2.Speed,"*PRI",4) != 00) )
                     Count = Count +1;

if ( (THDREC2.Busy == 'N') &&
                  (strcmp(THDREC2.Speed,Speed) == 00) &&
                  (memcmp(THDREC2.User,UserPrf,strlen(UserPrf)) == 00) &&
                  (memcmp(THDREC2.Speed,"*PRI",4) != 00) )
                     break;

if ( (THDREC2.Busy == 'N') &&
                  (strcmp(THDREC2.Speed,Speed) == 00) &&
                  (strcmp(UserPrf,"*ANY") == 00) &&
                  (memcmp(THDREC2.Speed,"*PRI",4) != 00) )
                     break;
           rc = LocThrdD(Lib,THDREC,&THDREC2,&SpcRow,&SpcLeft,&SpcPtr,
                      "*NEXT");
        †

UnLock(Lib,SPCNAMETHD,"*SHRRD");

if (Count == 00)
    return(2);

if (rc != 00)
    §
     Choice = rand();
     Choice = Choice - ( (Choice/Count) * Count);
     Choice = Choice + 1;
     Defer  = 1;

Lock(Lib,SPCNAMETHD,"*SHRRD");
     rc = LocThrdD(Lib,THDREC,&THDREC2,&SpcRow,&SpcLeft,&SpcPtr,
                   "*FRST");
     Count = 0;
     while (rc == 00)
         §
          if ( (strcmp(THDREC2.Speed,Speed) == 00) &&
                 (memcmp(THDREC2.User,UserPrf,strlen(UserPrf)) == 00) &&
                 (memcmp(THDREC2.Speed,"*PRI",4) != 00) )
                    Count = Count +1;

if ( (strcmp(THDREC2.Speed,Speed) == 00) &&
                 (strcmp(UserPrf,"*ANY") == 00) &&
                 (memcmp(THDREC2.Speed,"*PRI",4) != 00) )
                    Count = Count +1;
```

Appendix-19

```
          if (Count == Choice)
              break;

rc = LocThrdD(Lib,THDREC,&THDREC2,&SpcRow,&SpcLeft,&SpcPtr,
                      "*NEXT");
       †

UnLock(Lib,SPCNAMETHD,"*SHRRD");

if (rc != 00)
       return(2);
 † memset(Job,'®0',AS400NAMESZ);
 if (rc == 00)
  §
    memset(Job,'®0',AS400NAMESZ+1);
    memcpy(Job,THDREC2.ThdName,AS400NAMESZ);
    for (i = 0; i _ AS400NAMESZ; ++i)
       §
         if (Job[i] == ' ')
            §
             Job[i] = '®0';
             break;
            †
       † if (Defer == 1)
       return(1);

return(0);
   †

†

/******************************************************************/
/* Function InitThrds ...                                         */
/******************************************************************/
int InitThrds(char *Lib, char *Parm)
 §
   int  rc,i;
   int  Msgtxtsz;
   char SpaceInit[1];
   char ThrdLib[20+1];
   char Msgid[AS400MSGIDSZ];         /* Message from check API    */
   char Msgtxt[SPACE_TEXT_SIZE];     /* Returned message from API */
   char Buffer[256];
```

Appendix-20

```
struct space_error err;        /* IBM API error structure    */
struct space_error *errptr;    /* IBM API error structure    */ errptr = &err;
err.space_error_size = SPACE_TEXT_SIZE;
SpaceInit[0] = '®0';

memset(Buffer,'®0',sizeof(Buffer));
sprintf(Buffer,
        "DLTDTAQ DTAQ(%s/%s) ",
        Lib,PRIMQ);
system(Buffer);

memset(Buffer,'®0',sizeof(Buffer));
sprintf(Buffer,
        "DLTDTAQ DTAQ(%s/%s) ",
        Lib,"Q#*");
system(Buffer);

memset(Buffer,'®0',sizeof(Buffer));
sprintf(Buffer,
        "CRTDTAQ DTAQ(%s/%s) MAXLEN(1024) SEQ(*KEYED) KEYLEN(16) ",
        Lib,PRIMQ);
rc = system(Buffer);
if (rc != 00)
   return(1);

memset(Buffer,'®0',sizeof(Buffer));
sprintf(Buffer,
        "DLTDTAQ DTAQ(%s/%s) ",
        Lib,SECONDQ);
system(Buffer);

memset(Buffer,'®0',sizeof(Buffer));
sprintf(Buffer,
        "CRTDTAQ DTAQ(%s/%s) MAXLEN(1024) SEQ(*KEYED) KEYLEN(16) ",
        Lib,SECONDQ);
rc = system(Buffer);
if (rc != 00)
   return(1);

memset(ThrdLib,' ',sizeof(ThrdLib));
memcpy(ThrdLib,SPCTHD,strlen(SPCTHD));
memcpy(ThrdLib+AS400NAMESZ,Lib,strlen(Lib));

QUSDLTUS(ThrdLib,errptr);
QUSCRTUS(ThrdLib,
         "CIB         ",
         SPCTHDSIZE,
```

Appendix-21

```c
            SpaceInit,
            "*ALL      ",
            "Contains Thread Information                     ",
            "*NO       ",
            errptr);

if (CheckAPI(errptr,Msgid,Msgtxt,&Msgtxtsz) != 00)
       if (memcmp(Msgid,"CPF9870",MSGIDSZ) != 00)
           return(2);

return(0);
 }

/******************************************************************/
/* Function DeleteThrds ...                                       */
/******************************************************************/
int DeleteThrds(char *Lib, char *Parm)
 {
   int  rc,i;
   int  Msgtxtsz;
   int  SpcRow;
   int  SpcNext;
   int  SpcLeft;

char SpaceInit[1];
   char ThrdLib[20+1];
   char ThrdName[10+1];
   char Msgid[AS400MSGIDSZ];        /* Message from check API     */
   char Msgtxt[SPACE_TEXT_SIZE];    /* Returned message from API  */
   char Buffer[256];
   char *SpcPtr;

struct Thd_Work  THDWORK;
   struct Thd_Table THDREC;
   struct Thd_Table THDREC2;
   struct space_error err;          /* IBM API error structure    */
   struct space_error *errptr;      /* IBM API error structure    */ errptr = &err;
   err.space_error_size = SPACE_TEXT_SIZE;
   SpaceInit[0] = '®0';

memset(THDREC.ThdName,' ',AS400NAMESZ);
   memcpy(THDREC.ThdName,"*",1);
   Lock(Lib,SPCNAMETHD,"*EXCL");

rc = LocThrdD(Lib,THDREC,&THDREC2,&SpcRow,&SpcLeft,&SpcPtr,
                 "*FRST");
   while (rc == 00)
      {
```

Appendix-22

```
      memset(ThrdName,'/0',sizeof(ThrdName));
      memcpy(ThrdName,THDREC2.Job,strlen(THDREC2.Job));

PurThrd(Lib,ThrdName,"*THRD");

rc = LocThrdD(Lib,THDREC,&THDREC2,&SpcRow,&SpcLeft,&SpcPtr,
              "*NEXT");
    †

UnLock(Lib,SPCNAMETHD,"*EXCL");

memset(Buffer,'®0',sizeof(Buffer));
   sprintf(Buffer,
           "DLTDTAQ DTAQ(%s/%s) ",
           Lib,PRIMQ);
   system(Buffer);

memset(Buffer,'®0',sizeof(Buffer));
   sprintf(Buffer,
           "DLTDTAQ DTAQ(%s/%s) ",
           Lib,SECONDQ);
   system(Buffer);

memset(Buffer,'®0',sizeof(Buffer));
   sprintf(Buffer,
           "DLTDTAQ DTAQ(%s/%s) ",
           Lib,"Q#*");
   system(Buffer);

memset(ThrdLib,' ',sizeof(ThrdLib));
   memcpy(ThrdLib,SPCTHD,strlen(SPCTHD));
   memcpy(ThrdLib+AS400NAMESZ,Lib,strlen(Lib));

QUSDLTUS(ThrdLib,errptr);

return(0);
 †

/****************************************************************/
/* Function   ClrThrd ...                                       */
/****************************************************************/
int ClrThrd(char *Lib, char *Job, char *Type)
 §
   int  rc;
   int  i,j,k;
   int  Msgtxtsz;              /* Error API message size       */
   int  RetVal;
   int  SpcRow;
   int  SpcLeft;
   long Buffsz;
```

Appendix-23

```
char Msgid[AS400MSGIDSZ];           /* Message from check API      */
char Msgtxt[SPACE_TEXT_SIZE];       /* Returned message from API   */
char JobKey[NPTKEYSZ+1];
char Userid[AS400NAMESZ];           /* Userid of this job          */
char JobName[26];
char JobPrf[AS400NAMESZ];
char SbmJob[256];
char Buffer[256];
char User[AS400NAMESZ+1];
char MyKey[NPTKEYSZ];

char *SpcPtr;

struct Thd_Work  THDWORK;
struct space_error err;             /* IBM API error structure     */
struct space_error *errptr;         /* IBM API error structure     */ errptr = &err;
err.space_error_size = SPACE_TEXT_SIZE;

Lock(Lib,SPCNAMETHD,"*EXCL");
memset((char *)&THDWORK,'®0',sizeof(THDWORK));
memset(MyKey,'#',NPTKEYSZ);
ReceiveFromDataQueue(Lib,
                     PRIMQ,
                     (char *)&THDWORK,
                     &Buffsz,
                     MyKey,
                     NPTKEYSZ,
                     "NE",
                     0,
                     JobName,
                     JobPrf);

while(Buffsz != 0)
    §
    if (strcmp(Type,"*THRD") == 00)
       §
       if (memcmp(MyKey,Job,strlen(Job)) != 00)
          §
          SendToDataQueue(Lib,
                          SECONDQ,
                          (char *)&THDWORK,
                          Buffsz,
                          MyKey,
                          NPTKEYSZ);
          †

†
```

Appendix-24

```
     if (strcmp(Type,"*RELATION") == 00)
        §
          if (strcmp(THDWORK.Related,Job) != 00)
             §
               SendToDataQueue(Lib,
                               SECONDQ,
                               (char *)&THDWORK,
                               Buffsz,
                               MyKey,
                               NPTKEYSZ);
             †

† memset((char *)&THDWORK,'®0',sizeof(THDWORK));
     memset(MyKey,'#',NPTKEYSZ);
     ReceiveFromDataQueue(Lib,
                          PRIMQ,
                          (char *)&THDWORK,
                          &Buffsz,
                          MyKey,
                          NPTKEYSZ,
                          "NE",
                          0,
                          JobName,
                          JobPrf);

† memset((char *)&THDWORK,'®0',sizeof(THDWORK));
memset(MyKey,'#',NPTKEYSZ);
ReceiveFromDataQueue(Lib,
                     SECONDQ,
                     (char *)&THDWORK,
                     &Buffsz,
                     MyKey,
                     NPTKEYSZ,
                     "NE",
                     0,
                     JobName,
                     JobPrf);

while(Buffsz != 0)
    §
       SendToDataQueue(Lib,
                       PRIMQ,
                       (char *)&THDWORK,
                       Buffsz,
```

Appendix-25

```
                              MyKey,
                              NPTKEYSZ);

memset((char *)&THDWORK,'®0',sizeof(THDWORK));
      memset(MyKey,'#',NPTKEYSZ);
      ReceiveFromDataQueue(Lib,
                           SECONDQ,
                           (char *)&THDWORK,
                           &Buffsz,
                           MyKey,
                           NPTKEYSZ,
                           "NE",
                           0,
                           JobName,
                           JobPrf);

†

UnLock(Lib,SPCNAMETHD,"*EXCL");
   return(0);
†

/*****************************************************************/
/* Module ClnThrd ...                                            */
/*****************************************************************/
int ClnThrd(char *Lib, char *Job, char *Type, char *NewJob,
            char *NewUser, char *Thdid)
  §
   int   rc;
   int   i,j,k;
   int   Msgtxtsz;                  /* Error API message size     */
   int   RetVal;
   int   SpcRow;
   int   SpcLeft;
   long  Buffsz;

char  Msgid[AS400MSGIDSZ];       /* Message from check API     */
   char  Msgtxt[SPACE_TEXT_SIZE];   /* Returned message from API  */
   char  JobKey[NPTKEYSZ+1];
   char  Userid[AS400NAMESZ];       /* Userid of this job         */
   char  JobName[26];
   char  JobPrf[AS400NAMESZ];
   char  SbmJob[256];
   char  Buffer[256];
   char  User[AS400NAMESZ+1];
   char  JobD[AS400NAMESZ+1];
   char  JobDLib[AS400NAMESZ+1];
   char  JobQ[AS400NAMESZ+1];
   char  JobQLib[AS400NAMESZ+1];
   char  CurLib[AS400NAMESZ+1];
```

```
char    ThrdId[AS400NAMESZ+1];
char    JobDLong[21+1];
char    JobQLong[21+1];
char    JobSelect[26+1];
char    ReplaceJob[10+1];

char    *SpcPtr;

struct Thd_Table THDREC;
struct Thd_Table THDREC2;
struct jobi0300  JOB300;
struct jobi0400  JOB400;
struct jobi0700  JOB700;
struct space_error err;           /* IBM API error structure    */
struct space_error *errptr;       /* IBM API error structure    */ errptr = &err;
err.space_error_size = SPACE_TEXT_SIZE;
memset(Thdid,'®0',AS400NAMESZ+1);

if (strcmp(Type,"*THRD") == 00)
    §
    memset(THDREC.ThdName,' ',AS400NAMESZ);
    memcpy(THDREC.ThdName,Job,strlen(Job));
    Lock(Lib,SPCNAMETHD,"*SHRRD");
    rc = LocThrdD(Lib,THDREC,&THDREC2,&SpcRow,&SpcLeft,&SpcPtr,
                  "*FRST");
    UnLock(Lib,SPCNAMETHD,"*SHRRD");
    if (rc != 00)
        return(1);
    † if (strcmp(Type,"*ATTR") == 00)
    §
    memset(THDREC.ThdName,' ',AS400NAMESZ);
    memcpy(THDREC.ThdName,"*",1);
    Lock(Lib,SPCNAMETHD,"*SHRRD");
    rc = LocThrdD(Lib,THDREC,&THDREC2,&SpcRow,&SpcLeft,&SpcPtr,
                  "*FRST");

while (rc == 00)
        §
        if (strcmp(THDREC2.Speed,Job) == 00)
           §
             break;
           † rc = LocThrdD(Lib,THDREC,&THDREC2,&SpcRow,&SpcLeft,&SpcPtr,
                      "*NEXT");
```

Appendix-27

```
        †
    UnLock(Lib,SPCNAMETHD,"*SHRRD");
    †
if (rc != 00)
        return(1);

memset(JobSelect,' ',sizeof(JobSelect));
memcpy(JobSelect,THDREC2.Job,strlen(THDREC2.Job));
memcpy(JobSelect+10,THDREC2.User,strlen(THDREC2.User));
memcpy(JobSelect+20,THDREC2.Number,strlen(THDREC2.Number));

QUSRJOBI(&JOB300,
         sizeof(JOB300),
         "JOBI0300",
         JobSelect,
         "          ",
         errptr);

QUSRJOBI(&JOB400,
         sizeof(JOB400),
         "JOBI0400",
         JobSelect,
         "          ",
         errptr);

QUSRJOBI(&JOB700,
         sizeof(JOB700),
         "JOBI0700",
         JobSelect,
         "          ",
         errptr);

memset(User,'®0',sizeof(User));
for (i = 0; i_ AS400NAMESZ; ++i)
    §
        if (JOB300.user_name[i] == ' ')
            break;
        User[i] = JOB300.user_name[i];
    † memset(JobQ,'®0',sizeof(JobQ));
for (i = 0; i_ AS400NAMESZ; ++i)
    §
        if (JOB300.jobq_name[i] == ' ')
            break;
        JobQ[i] = JOB300.jobq_name[i];
    †
```

Appendix-28

```
memset(JobQLib,'®0',sizeof(JobQLib));
for (i = 0; i_ AS400NAMESZ; ++i)
    §
      if (JOB300.jobq_lib[i] == ' ')
         break;
      JobQLib[i] = JOB300.jobq_lib[i];
    † memset(JobD,'®0',sizeof(JobD));
for (i = 0; i_ AS400NAMESZ; ++i)
    §
      if (JOB400.job_desc_name[i] == ' ')
         break;
      JobD[i] = JOB400.job_desc_name[i];
    † memset(JobDLib,'®0',sizeof(JobDLib));
for (i = 0; i_ AS400NAMESZ; ++i)
    §
      if (JOB400.job_desc_lib[i] == ' ')
         break;
      JobDLib[i] = JOB400.job_desc_lib[i];
    † memset(CurLib,'®0',sizeof(CurLib));
j = JOB700.libs_in_syslibl + JOB700.prod_libs;

for (i = 0; i_ AS400NAMESZ; ++i)
    §
      if (JOB700.lib[j].lib_name[i] == ' ')
         break;
      CurLib[i] = JOB700.lib[j].lib_name[i];
    † memset(JobQLong,'®0',sizeof(JobQLong));
memset(JobDLong,'®0',sizeof(JobDLong));
memset(ReplaceJob,'®0',sizeof(ReplaceJob));

strcat(JobQLong,JobQLib);
strcat(JobQLong,"/");
strcat(JobQLong,JobQ);

strcat(JobDLong,JobDLib);
strcat(JobDLong,"/");
strcat(JobDLong,JobD);

if (strcmp(NewJob,"*RECYCLE") == 00)
    §
     rc = PurThrd(Lib,
```

Appendix-29

```
                      THDREC2.Job,
                      "*THRD");
       if (rc != 00)
          return(4);

strcat(ReplaceJob,THDREC2.Job);
       } else
       {
        strcat(ReplaceJob,NewJob);
       } if (strcmp(NewUser,"*SAME") != 00)
       {
        memset(User,'@0',sizeof(User));
        strcat(User,NewUser);
       } rc = CrtThrd(Lib,
                 ReplaceJob,
                 "*NONE",
                 THDREC2.Speed,
                 JobDLong,
                 JobQLong,
                 User,
                 CurLib,
                 Thdid);

if (rc != 00)
       return(3);

return(0);

}
/*********************************************************************/
/******                                                        ******/
/****    AS/400 Thread Services                                 ****/
/***                                                             ****/
/*      FILE NAME:         Q1CSPTHD.C                              */
/*      Language: C                                                */
/*      TYPE: Thread Services Subroutines                          */
/*      Comment: Subroutines used to support thread scheduling    */
/*               services.                                         */
/*                                                                 */
/*                                                                 */
/***                                                             ****/
/*****                                                         ****/
/******                                                       ******/
```

Appendix-30

```
/********************************************************************/
#include _stdio.h¢                /* Standard I/O header            */
#include _stdlib.h¢               /* Standard library header        */
include _string.h¢               /* String handling utilities      */ include _opusapi.qattsysc¢       /* QUSRTOOL IBM supplied          */
include _opsyapi.qattsysc¢       /* QUSRTOOL IBM supplied          */
#include _opmhapi.qattsysc¢       /* QUSRTOOL IBM supplied          */
#include _qlchead.qcsrc¢          /* Thread header                  */

/********************************************************************/
/* Description: Module                                              */
/********************************************************************/

/********************************************************************/
/* Module LocThrd                                                   */
/********************************************************************/
int LocThrdD(char *Lib, struct Thd_Table THDREC, struct Thd_Table
             *THDREC2, int *SpcRow, int *SpcCount, char **SpcPtr,
             char *Option)
§
  int  rc;
  int  i,j,k;                    /* General loop counters           */
  int  SpaceSize;                /* UserSpace initial size          */
  int  SpcMaxRecs;
  int  Count;
  int  WildCardSz;
  int  StrRow;
  int  Msgtxtsz;

static char  UsrSpcPtrValid = 'N';
  static char  *USRPTR;

char SpaceInit;                /* Initial space value             */
  char *CurrPtr;
  char ThrdLib[20];

struct Thd_Table *ThdPtr;
  struct Thd_Table ThdRecord;

/********************************************************************/
/* Initialize Variables                                             */
/********************************************************************/

SpaceInit = SPCINIT;
  SpcMaxRecs = ( (SPCTHDSIZE - SPCHEADER) / sizeof(ThdRecord) ) - 1;
  memset(ThrdLib,' ',sizeof(ThrdLib));
  memcpy(ThrdLib,SPCTHD,strlen(SPCTHD));
  memcpy(ThrdLib+10,Lib,strlen(Lib));
```

Appendix-31

```c
/*******************************************************************/
/* Locate UserSpace Pointer and save in static area for later      */
/*******************************************************************/ if (UsrSpcPtrValid == 'N')
      §
       QUSPTRUS(ThrdLib,&USRPTR);
       UsrSpcPtrValid = 'Y';
      † if (memcmp(Option,"*FRST",5) == 00)
      §
        CurrPtr = USRPTR;
        memcpy((char *)&Count,CurrPtr,sizeof(Count));
        CurrPtr = CurrPtr + SPCHEADER;
        ThdPtr = (struct Thd_Table *)CurrPtr;
        StrRow = 0;
      † else
      §
        ThdPtr = (struct Thd_Table *)*SpcPtr;
        ThdPtr = ThdPtr + 1;
        StrRow = *SpcRow;
        StrRow = StrRow + 1;
        Count = *SpcCount;
        Count = Count - 1;
      †

WildCardSz = AS400NAMESZ;
   for (i = 0; i _ AS400NAMESZ; ++i)
      §
        if (THDREC.ThdName[i] == '*')
           §
             WildCardSz = i;
             break;
           †
      † for (i = StrRow; ((i _ SpcMaxRecs) && (Count ¢ 0)); ++i)
      §
        if ( (ThdPtr-¢ThdName[0] != SpaceInit) )
           §
             if ( (memcmp(ThdPtr-¢ThdName,
                          THDREC.ThdName,
                          WildCardSz) == 00) &&
                  (ThdPtr-¢ThdName[0] != SpaceInit) )

§
```

Appendix-32

```
                  break;
               }

Count = Count - 1;
         }

ThdPtr = ThdPtr + 1;
      } if (Count == 0)
      return(1);
/*****************************************************************/
/* Update the UserSpace entry count to reflect this delete       */
/*****************************************************************/ memcpy((char *)THDREC2,ThdPtr,sizeof(THDREC));
   *SpcRow = i;
   *SpcCount = Count;
   *SpcPtr = (char *)ThdPtr;
   return(0);

}

/*****************************************************************/
/* Module ChgThd ...                                             */
/*****************************************************************/
int ChgThrdD(char *Lib, struct Thd_Table  THDREC)
 {
   int   rc;
   int   i,j,k;              /* General loop counters         */
   int   SpaceSize;          /* UserSpace initial size        */
   int   SpcMaxRecs;
   int   Count;

static char   UsrSpcPtrValid = 'N';
   static char   *USRPTR;

char SpaceInit;            /* Initial space value           */
   char *CurrPtr;
   char ThrdLib[20];

struct Thd_Table   *ThdPtr;
   struct Thd_Table   ThdRecord;

/*****************************************************************/
/* Initialize Variables                                          */
/*****************************************************************/
```

Appendix-33

```
    SpaceInit = SPCINIT;
    SpcMaxRecs = ( (SPCTHDSIZE - SPCHEADER) / sizeof(ThdRecord) ) - 1;
    memset(ThrdLib,' ',sizeof(ThrdLib));
    memcpy(ThrdLib,SPCTHD,strlen(SPCTHD));
    memcpy(ThrdLib+10,Lib,strlen(Lib));

/******************************************************************/
/* Locate UserSpace Pointer and save in static area for later     */
/******************************************************************/ if (UsrSpcPtrValid == 'N')
        §
         QUSPTRUS(ThrdLib,&USRPTR);
         UsrSpcPtrValid = 'Y';
        †

CurrPtr = USRPTR;
    memcpy((char *)&Count,CurrPtr,sizeof(Count));
    CurrPtr = CurrPtr + SPCHEADER;

ThdPtr = (struct Thd_Table *)CurrPtr;
    for (i = 0; ((i _ SpcMaxRecs) && (Count ¢ 0)); ++i)
        §
         if ( (ThdPtr-¢ThdName[0] != SpaceInit) )
             §
              if (memcmp(ThdPtr-¢ThdName,
                        THDREC.ThdName,
                        AS400NAMESZ) == 00)
                  §
                   break;
                  †
              Count = Count - 1;
             †
         ThdPtr  = ThdPtr + 1;
        † if (Count == 0)
        return(1);

memcpy(ThdPtr,(char *)&THDREC,sizeof(THDREC));

return(0);

†

/******************************************************************/
/* Module DltThd ...                                              */
/******************************************************************/
int DltThrdD(char *Lib, struct Thd_Table  THDREC)
```

Appendix-34

```c
{
   int   rc;
   int   i,j,k;                   /* General loop counters    */
   int   SpaceSize;               /* UserSpace initial size   */
   int   SpcMaxRecs;
   int   Count;

static char   UsrSpcPtrValid = 'N';
   static char   *USRPTR;

char SpaceInit;                /* Initial space value      */
   char *CurrPtr;
   char ThrdLib[20];

struct  Thd_Table  *ThdPtr;
   struct  Thd_Table  ThdRecord;

/********************************************************************/
/* Initialize Variables                                             */
/********************************************************************/

SpaceInit = SPCINIT;
   SpcMaxRecs = ( (SPCTHDSIZE - SPCHEADER) / sizeof(ThdRecord) ) - 1;
   memset(ThrdLib,' ',sizeof(ThrdLib));
   memcpy(ThrdLib,SPCTHD,strlen(SPCTHD));
   memcpy(ThrdLib+10,Lib,strlen(Lib));

/********************************************************************/
/* Locate UserSpace Pointer and save in static area for later       */
/********************************************************************/ if (UsrSpcPtrValid == 'N')
     {
       QUSPTRUS(ThrdLib,&USRPTR);
       UsrSpcPtrValid = 'Y';
     }

CurrPtr = USRPTR;
   memcpy((char *)&Count,CurrPtr,sizeof(Count));
   CurrPtr = CurrPtr + SPCHEADER;

ThdPtr = (struct Thd_Table *)CurrPtr;
   for (i = 0; ((i _ SpcMaxRecs) && (Count ¢ 0)); ++i)
      {
        if (ThdPtr-¢ThdName[0] != SpaceInit)
           {
              if (memcmp(ThdPtr-¢ThdName,
                         THDREC.ThdName,
                         AS400NAMESZ) == 00)
                 {
```

```c
                  break;
            }
         Count = Count - 1;
         }
      ThdPtr = ThdPtr + 1;
      } if (Count == 0)
      return(1);

/*******************************************************************/
/* Update the UserSpace entry count to reflect this delete         */
/*******************************************************************/
   memset(ThdPtr,SpaceInit,sizeof(THDREC));
   memcpy((char *)&Count,USRPTR,sizeof(Count));
   Count = Count - 1;
   memcpy(USRPTR,(char *)&Count,sizeof(Count));

return(0);

}

/*******************************************************************/
/* Module CrtThd ...                                               */
/*******************************************************************/
int CrtThrdD(char *Lib, struct Thd_Table   THDREC)
 {
   int   rc;
   int   i,j,k;                   /* General loop counters         */
   int   SpaceSize;               /* UserSpace initial size        */
   int   SpcMaxRecs;
   int   Count;

static char    UsrSpcPtrValid = 'N';
   static char    *USRPTR;

char SpaceInit;                /* Initial space value           */
   char *CurrPtr;
   char ThrdLib[20];

struct  Thd_Table  *ThdPtr;
   struct  Thd_Table  ThdRecord;

/*******************************************************************/
/* Initialize Variables                                            */
/*******************************************************************/
   SpaceInit = SPCINIT;
```

Appendix-36

```
    SpcMaxRecs = ( (SPCTHDSIZE - SPCHEADER) / sizeof(ThdRecord) ) - 1;
    memset(ThrdLib,' ',sizeof(ThrdLib));
    memcpy(ThrdLib,SPCTHD,strlen(SPCTHD));
    memcpy(ThrdLib+10,Lib,strlen(Lib));

/******************************************************************/
/* Locate UserSpace Pointer and save in static area for later      */
/******************************************************************/ if (UsrSpcPtrValid == 'N')
       §
         QUSPTRUS(ThrdLib,&USRPTR);
         UsrSpcPtrValid = 'Y';
       †

/******************************************************************/
/* Locate First available record in Environment UserSpace          */
/******************************************************************/

CurrPtr = USRPTR;
    CurrPtr = CurrPtr + SPCHEADER;

ThdPtr = (struct Thd_Table *)CurrPtr;
    for (i = 0; i _ SpcMaxRecs;  ++i)
       §
         if ( (ThdPtr-¢ThdName[0] == SpaceInit) )
            §
              memcpy(ThdPtr,(char *)&THDREC,sizeof(THDREC));
              break;
            †

ThdPtr = ThdPtr + 1;
       †

/******************************************************************/
/* If not found, return.  Else, Adjust UserSpace entry count       */
/******************************************************************/ if (i == SpcMaxRecs)
       return(1);

CurrPtr = USRPTR;
    memcpy((char *)&Count,CurrPtr,sizeof(Count));
    Count = Count + 1;
    memcpy(CurrPtr,(char *)&Count,sizeof(Count));

return(0);

†
```

Appendix-37

```c
/*******************************************************************/
/* Module FndThd ...                                               */
/*******************************************************************/
int FndThrdD(char *Lib, struct Thd_Table THDREC)
 §
   int   rc;
   int   i,j,k;                     /* General loop counters       */
   int   SpaceSize;                 /* UserSpace initial size      */
   int   SpcMaxRecs;
   int   Count;

static char   UsrSpcPtrValid = 'N';
   static char   *USRPTR;

char SpaceInit;                  /* Initial space value         */
   char *CurrPtr;
   char ThrdLib[20];

struct Thd_Table  *ThdPtr;
   struct Thd_Table  ThdRecord;
/*******************************************************************/
/* Initialize Variables                                            */
/*******************************************************************/
   SpaceInit = SPCINIT;
   SpcMaxRecs = ( (SPCTHDSIZE - SPCHEADER) / sizeof(ThdRecord) ) - 1;
   memset(ThrdLib,' ',sizeof(ThrdLib));
   memcpy(ThrdLib,SPCTHD,strlen(SPCTHD));
   memcpy(ThrdLib+10,Lib,strlen(Lib));

/*******************************************************************/
/* Locate UserSpace Pointer and save in static area for later      */
/*******************************************************************/
   if (UsrSpcPtrValid == 'N')
      §
       QUSPTRUS(ThrdLib,&USRPTR);
       UsrSpcPtrValid = 'Y';
      †

CurrPtr = USRPTR;
   memcpy((char *)&Count,CurrPtr,sizeof(Count));
   CurrPtr = CurrPtr + SPCHEADER;

ThdPtr = (struct Thd_Table *)CurrPtr;
   for (i = 0; ((i _ SpcMaxRecs) && (Count ¢ 0)); ++i)
      §
       if ( (ThdPtr-¢ThdName[0] != SpaceInit) )
           §
```

Appendix-38

```
            if (memcmp(ThdPtr-¢ThdName,
                      THDREC.ThdName,
                      AS400NAMESZ) == 00)
               §
                 break;
               †
            Count = Count - 1;
         †
         ThdPtr = ThdPtr + 1;
         † if (Count == 0)
         return(1);

return(0);

†

/******************************************************************/
/* Module WaitThrd ...                                            */
/******************************************************************/
int WaitThrd(char *Lib, char *ThdName, int WaitTm, char *Type)
  §
    int  rc;
    int  i,j,k;                   /* General loop counters         */
    int  WaitTime;
    int  Msgtxtsz;
    long Buffsz;

char Buffer[1024];
    char JobName[AS400NAMESZ+1];
    char JobPrf[26];
    char ThrdKey[NPTKEYSZ];
    char ThrdQ[NPTKEYSZ];
    char Msgid[AS400MSGIDSZ];     /* Message from check API        */
    char Msgtxt[SPACE_TEXT_SIZE]; /* Returned message from API     */
    char Userid[AS400NAMESZ];     /* Userid                        */
    char JobKey[AS400NAMESZ];     /* Unique key for DataQ access   */ struct Thd_Post THDPOST;

if (strcmp(Type,"*THRD") == 00)
        §
          Buffsz = 0;
          memset(ThrdKey,' ',NPTKEYSZ);
          memcpy(ThrdKey,ThdName,strlen(ThdName));
          memset(ThrdQ,'®0',NPTKEYSZ);
          strcat(ThrdQ,ThdName);

ReceiveFromDataQueue(Lib,
```

Appendix-39

```
                        ThrdQ,
                        (char *)&THDPOST,
                        &Buffsz,
                        ThrdKey,
                        NPTKEYSZ,
                        "EQ",
                        WaitTm,
                        JobName,
                        JobPrf);

if (Buffsz == 00)
      return(1);
    if (THDPOST.Status == THRD_FAILED)
      return(2);
    if (THDPOST.Status == THRD_SECURITY)
      return(3);
  } if (strcmp(Type,"*WORK") == 00)
  {
    RetrieveUniqueJobId(JobKey,Userid,Msgid,Msgtxt,&Msgtxtsz);
    Buffsz = 0;
    memset(ThrdKey,' ',NPTKEYSZ);
    memcpy(ThrdKey,JobKey,sizeof(JobKey));
    memset(ThrdQ,'\0',NPTKEYSZ);
    strcat(ThrdQ,ThdName);

ReceiveFromDataQueue(Lib,
                        ThrdQ,
                        (char *)&THDPOST,
                        &Buffsz,
                        ThrdKey,
                        NPTKEYSZ,
                        "EQ",
                        WaitTm,
                        JobName,
                        JobPrf);

if (Buffsz == 00)
      return(1);
    if (THDPOST.Status == THRD_FAILED)
      return(2);
    if (THDPOST.Status == THRD_SECURITY)
      return(3);

}
return(0);
```

Appendix-40

```c
/****************************************************************/
/******                                                   ******/
/****    AS/400 Thread Services                            *****/
/***                                                        ****/
/*      FILE NAME:        Q1CTHRD.C                            */
/*      Language: C                                            */
/*      TYPE: Thread Batch Job                                 */
/*      Comment: Submitted by create thread services and performs */
/*               the function of a thread.                     */
/*                                                             */
/*                                                             */
/***                                                        ****/
/*****                                                     ****/
/******                                                   ******/
/****************************************************************/
#include _stdio.h¢              /* Standard I/O header         */
#include _stdlib.h¢             /* Standard library header     */
#include _string.h¢             /* String handling utilities   */
include _signal.h¢ include _opusapi.qattsysc¢     /* QUSRTOOL IBM supplied       */
include _opsyapi.qattsysc¢     /* QUSRTOOL IBM supplied       */
#include _opmhapi.qattsysc¢     /* QUSRTOOL IBM supplied       */
include _q1chead.qcsrc¢        /* Thread headers              */ define noPASSWORD                                              _02 pragma linkage(QSYGETPH,OS)
void QSYGETPH(char *, char *, char *);

#pragma linkage(QSYRLSPH,OS)
void QSYRLSPH(char *);

#pragma linkage(QWTSETP,OS)
void QWTSETP(char *);

static void SigHandler(int sig);
char SigFlag;
char SigReturnMsg[12];
static void (*OldSig)();

/****************************************************************/
/* Main routine starts ...                                      */
/****************************************************************/
main (int argv, char *argc[])
 §
    int  rc;
    int  i,j,k;                 /* General loop counters        */
```

Appendix-41

```
      int   Msgtxtsz;
      int   SysRc;
      int   WaitTime;
      long  Buffsz;                           /* DataQueue buffer length       */ char Key[NPTKEYSZ];                     /* Keysize for product queues    */
      char JobName[JOBUSRNUMSZ];              /* Job-userid-number from queue  */
      char JobPrf[AS400NAMESZ];               /* Job profile from queue        */
      char Msgid[AS400MSGIDSZ];               /* Message from check API        */
      char Msgtxt[SPACE_TEXT_SIZE];           /* Returned message from API     */
      char Userid[AS400NAMESZ];               /* Userid                        */
      char JobKey[AS400NAMESZ];               /* Unique key for DataQ access   */
      char JobId[AS400NAMESZ];                /* Jobid                         */
      char MyKey[NPTKEYSZ];
      char Pgm[AS400NAMESZ+1];
      char Buffer[1000];
      char SecBuff[1000];
      char ThrdKey[NPTKEYSZ];
      char ThrdQ[NPTKEYSZ];
      char Lib[10+1];
      char ThrdLib[20+1];
      char CurrHand[12];
      char MainHand[12];
      char SwpUser[10+1];

static char  *USRPTR;

struct Thd_Table THDREC;                /* Single ENV entry              */
      struct Thd_Table THDREC2;               /* Single ENV entry              */
      struct Thd_Work  THDWORK;
      struct Thd_Post  THDPOST;
      struct jobi0100 objparm;                /* IBM mapping structure         */ struct space_error err;                 /* IBM API error structure       */
      struct space_error *errptr;             /* IBM API error structure       */ errptr = &err;
      err.space_error_size = SPACE_TEXT_SIZE;

/****************************************************************/
/* Resolve Pointer to the Thread UserSpace and build description */
/****************************************************************/
      memset(Lib,'®0',sizeof(Lib));
      for (i = 0; i _ AS400NAMESZ; ++i)
         §
            if (argc[0][i] == '/')
               break;
            Lib[i] = argc[0][i];
         †
```

```
    memset(Lib,'®0',sizeof(Lib));
    memcpy(Lib,"QAUTOTMP",8);

memset(ThrdLib,' ',sizeof(ThrdLib));
    memcpy(ThrdLib,SPCTHD,strlen(SPCTHD));
    memcpy(ThrdLib+10,Lib,strlen(Lib));

QUSPTRUS(ThrdLib,&USRPTR);

QUSRJOBI(&objparm,sizeof(objparm),"JOBI0100 ",
             "*                       ",
             "                        ",errptr);

RetrieveUniqueJobId(JobKey,Userid,Msgid,Msgtxt,&Msgtxtsz);

memset((char *)&THDREC,'®0',sizeof(THDREC));
    THDREC.Busy = 'N';
    memcpy(THDREC.ThdName,objparm.job_name,AS400NAMESZ);
    memcpy(THDREC.Job,objparm.job_name,AS400NAMESZ);
    memcpy(THDREC.Number,objparm.job_number,AS400NUMSZ);
    memcpy(THDREC.User,Userid,AS400NAMESZ);
    memset(THDREC.JobKey,' ',NPTKEYSZ);
    memcpy(THDREC.JobKey,JobKey,sizeof(JobKey));
    strcat(THDREC.Speed,argc[1]);
    WaitTime = -1;
    if (memcmp(argc[1],"#",1) == 00)
        WaitTime = 600;

memcpy(MyKey,THDREC.JobKey,NPTKEYSZ);
    memset(ThrdKey,' ',NPTKEYSZ);
    memcpy(ThrdKey,THDREC.ThdName,AS400NAMESZ);
    memset(ThrdQ,' ',NPTKEYSZ);
    memcpy(ThrdQ,THDREC.ThdName,AS400NAMESZ);
    for (i = 0; i <= AS400NAMESZ; ++i)
      {
        if (ThrdQ[i] == ' ')
            ThrdQ[i] = '®0';
      }

/******************************************************************/
/* Create Thread Description                                      */
/******************************************************************/

Lock(Lib,SPCNAMETHD,"*EXCL");
    if (FndThrdD(Lib,THDREC) == 00)
      {
        UnLock(Lib,SPCNAMETHD,"*EXCL");
        return(1);
      }
```

Appendix-43

```
    if (CrtThrdD(Lib,THDREC) != 00)
      §
        UnLock(Lib,SPCNAMETHD,"*EXCL");
        return(1);
      †

UnLock(Lib,SPCNAMETHD,"*EXCL");

/****************************************************************/
/* Aquire my user profile handle                                */
/****************************************************************/ ifdef PASSWORD                                              _02
    memset(SigReturnMsg,'®0',sizeof(SigReturnMsg));
    SigFlag='N';
    OldSig = signal(SIGALL,&SigHandler);

QSYGETPH("*CURRENT  ",
             "*NOPWD    ",
             MainHand);

signal(SIGALL,OldSig);

if (SigFlag == 'Y')
      §
       Lock(Lib,SPCNAMETHD,"*EXCL");
       DltThrdD(Lib,THDREC);
       UnLock(Lib,SPCNAMETHD,"*EXCL");
       return(0);
      †
endif
/****************************************************************/
/* Post caller that driver is active                            */
/****************************************************************/

THDPOST.Status = THRD_SUCCESS;
    if (SigFlag == 'Y')
       THDPOST.Status = THRD_SECURITY;

SendToDataQueue(Lib,
                    ThrdQ,
                    (char *)&THDPOST,
                    sizeof(AS400NAMESZ+NPTKEYSZ),
                    ThrdKey,
                    NPTKEYSZ);
```

Appendix-44

```c
/*********************************************************************/
/* Wait on DataQueue for program dispatch information                */
/*********************************************************************/ memset((char *)&THDWORK,'®0',sizeof(THDWORK));
   while(THDWORK.Type != 'E')
      §
      Lock  (Lib,SPCNAMETHD,"*EXCL");
      UnLock(Lib,SPCNAMETHD,"*EXCL");
      memset((char *)&THDWORK,'®0',sizeof(THDWORK));
      ReceiveFromDataQueue(Lib,
                           SCHEDULE,
                           (char *)&THDWORK,
                           &Buffsz,
                           MyKey,
                           NPTKEYSZ,
                           "EQ",
                           WaitTime,
                           JobName,
                           JobPrf);

if (Buffsz == 0)
         break;

/*********************************************************************/
/* Dispatch work to be done on thread                                */
/*********************************************************************/ if (THDWORK.Type == 'C')
         §
         memset(Pgm,'®0',sizeof(Pgm));
         memcpy(Pgm,THDWORK.PgmName,AS400NAMESZ);
         memset(Buffer,'®0',sizeof(Buffer));
         sprintf(Buffer,"%s %s ",
                 Pgm,
                 THDWORK.Parm);

THDREC.Busy = 'Y';
         Lock(Lib,SPCNAMETHD,"*EXCL");
         memset(THDREC.Related,'®0',sizeof(THDREC.Related));
         strcat(THDREC.Related,THDWORK.Related);
         ChgThrdD(Lib,THDREC);
         UnLock(Lib,SPCNAMETHD,"*EXCL");

memset(SigReturnMsg,'®0',sizeof(SigReturnMsg));
         SigFlag='N';
         OldSig = signal(SIGALL,&SigHandler);

memset(SwpUser,' ',sizeof(SwpUser));
```

Appendix-45

```
memcpy(SwpUser,THDWORK.User,strlen(THDWORK.User));

#ifdef PASSWORD                                                   _02
  QSYGETPH(SwpUser,
           "*NOPWD    ",
           CurrHand);
  if (SigFlag == 'N')
      QWTSETP(CurrHand);
endif signal(SIGALL,OldSig);

if (SigFlag == 'N')
    §
     SysRc = system(Buffer);
     #ifdef PASSWORD                                              _02
       QWTSETP(MainHand);
       QSYRLSPH(CurrHand);
     #endif
    † else
    §
     memset(Buffer,'®0',sizeof(Buffer));
     memset(SecBuff,'®0',sizeof(SecBuff));
     strcat(SecBuff,"*SECURITY ");
     strcat(SecBuff,THDWORK.Parm);
     sprintf(Buffer,"%s %s ",
             Pgm,
             SecBuff);
     system(Buffer);
    †

THDREC.Busy = 'N';
Lock(Lib,SPCNAMETHD,"*EXCL");
memset(THDREC.Related,'®0',sizeof(THDREC.Related));
ChgThrdD(Lib,THDREC);
UnLock(Lib,SPCNAMETHD,"*EXCL");

if (strcmp(THDWORK.Post,"*POST") == 00)
    §
     THDPOST.Status = THRD_SUCCESS;
     if (SysRc == 1)
         THDPOST.Status = THRD_FAILED;
     if (SigFlag == 'Y')
         THDPOST.Status = THRD_SECURITY;

SendToDataQueue(Lib,
                     ThrdQ,
                     (char *)&THDPOST,
```

Appendix-46

```
                              sizeof(AS400NAMESZ+NPTKEYSZ),
                              THDWORK.RspKey,
                              NPTKEYSZ);
        †
    † if (THDWORK.Type == 'P')
   §
     memset(Pgm,'®0',sizeof(Pgm));
     memcpy(Pgm,THDWORK.PgmName,AS400NAMESZ);
     memset(Buffer,'®0',sizeof(Buffer));
     sprintf(Buffer,"Call *LIBL/%s PARM('%s')",
             Pgm,
             THDWORK.Parm);

THDREC.Busy = 'Y';
     Lock(Lib,SPCNAMETHD,"*EXCL");
     memset(THDREC.Related,'®0',sizeof(THDREC.Related));
     strcat(THDREC.Related,THDWORK.Related);
     ChgThrdD(Lib,THDREC);
     UnLock(Lib,SPCNAMETHD,"*EXCL");

memset(SigReturnMsg,'®0',sizeof(SigReturnMsg));
     SigFlag='N';
     OldSig = signal(SIGALL,&SigHandler);

memset(SwpUser,' ',sizeof(SwpUser));
     memcpy(SwpUser,THDWORK.User,strlen(THDWORK.User));

#ifdef PASSWORD                                          _02
       QSYGETPH(SwpUser,
                "*NOPWD   ",
                CurrHand);

if (SigFlag == 'N')
          QWTSETP(CurrHand);
     #endif signal(SIGALL,OldSig);

if (SigFlag == 'N')
        §
          SysRc = system(Buffer);
          #ifdef PASSWORD                                     _02
            QWTSETP(MainHand);
            QSYRLSPH(CurrHand);
          #endif
        † else
```

```
      §
       memset(Buffer,'®0',sizeof(Buffer));
       memset(SecBuff,'®0',sizeof(SecBuff));
       strcat(SecBuff,"*SECURITY ");
       strcat(SecBuff,THDWORK.Parm);
       sprintf(Buffer,"%s %s ",
               Pgm,
               SecBuff);

system(Buffer);
      †

THDREC.Busy = 'N';
    Lock(Lib,SPCNAMETHD,"*EXCL");
    memset(THDREC.Related,'®0',sizeof(THDREC.Related));
    ChgThrdD(Lib,THDREC);
    UnLock(Lib,SPCNAMETHD,"*EXCL");

if (strcmp(THDWORK.Post,"*POST") == 00)
      §
       THDPOST.Status = THRD_SUCCESS;
       if (SysRc == 1)
           THDPOST.Status = THRD_FAILED;
       if (SigFlag == 'Y')
           THDPOST.Status = THRD_SECURITY;

SendToDataQueue(Lib,
                       ThrdQ,
                       (char *)&THDPOST,
                       sizeof(AS400NAMESZ+NPTKEYSZ),
                       THDWORK.RspKey,
                       NPTKEYSZ);
      †
   †
 †
/*****************************************************************/
/* Thread termination processing                                 */
/*****************************************************************/

Lock(Lib,SPCNAMETHD,"*EXCL");
    DltThrdD(Lib,THDREC);
    UnLock(Lib,SPCNAMETHD,"*EXCL");
    THDPOST.Status = THRD_SUCCESS;

SendToDataQueue(Lib,
                    ThrdQ,
                    (char *)&THDPOST,
                    sizeof(AS400NAMESZ+NPTKEYSZ),
                    ThrdKey,
                    NPTKEYSZ);
```

Appendix-48

```
†
#ifdef EPM
void SigHandler(int sig)
  §
    sigdata_t *sdata;

signal(SIGALL, &SigHandler);
    sdata = sigdata();
/*  1. obtain info about the signal from the EPM      */
    SigFlag = 'Y';
    memcpy(SigReturnMsg, sdata-¢exmsg-¢exmsgid, 7);

sdata-¢sigact-¢xhalt        = 0;
    sdata-¢sigact-¢xpmsg        = 1;
    sdata-¢sigact-¢xumsg        = 0;
    sdata-¢sigact-¢xdebug       = 0;
    sdata-¢sigact-¢xdecerr      = 0;
    sdata-¢sigact-¢xresigprior  = 0;
    sdata-¢sigact-¢xremovemsg   = 0;
    sdata-¢sigact-¢xrtntosgnler = 0;

†
endif ifdef ILE
void SigHandler(int sig)
§
   char temp[10];
   int offset = 0;
   _INTRPT_Hndlr_Parms_T   qdata ;

_GetExcData(&qdata);

signal(SIGALL , &SigHandler);   /* Reset signal handler */

SigFlag = 'Y';
   memcpy(SigReturnMsg, qdata.Msg_Id, 7);

†
endif
```

Appendix-49

What is claimed is:

1. A method of operating an AS/400 computer system, comprising the steps of:

applying each of a plurality of asynchronous thread tasks from an application as an input to each of a plurality of thread related batch jobs;

operating each such thread related batch job to perform the thread task applied thereto and produce return data associated with each said thread task;

applying the return data from each such thread related batch job to a single, common queue; and causing the application to wait on the common queue to sequentially retrieve the return data from each of said thread tasks therefrom.

2. The invention of claim 1, wherein the step of operating each batch job to perform the thread task applied thereto further comprises the steps of:

reapplying the thread task from each such thread related batch job to a job queue associated with a specialized batch job specifically created to perform the thread task applied to the thread related batch job;

operating the specialized batch job to
wait on the job queue,
retrieve the thread task therefrom,
perform the thread task, and
return data to the job queue associated with the performance of the thread task by the specialized batch job; and causing the thread related batch job to wait on the job queue to retrieve the return data therefrom, whereby the application may utilize preexisting specialized batch jobs not configured to return data to the common queue to perform as an asynchronous thread task.

3. The invention of claim 1, wherein the step of applying each of a plurality of asynchronous thread tasks from an application as an input to each of a plurality of thread related batch jobs further comprises the steps of:

applying each of the plurality of asynchronous thread tasks to a thread queue associated with each of the plurality of thread related batch jobs;

causing each such thread related batch job to wait on the thread queue associated therewith in order to retrieve the thread task thereon, whereby each thread related batch job may be used to sequentially perform a plurality of different thread tasks.

4. The invention of claim 1, further comprising the steps of:

creating an additional thread related batch job by cloning an existing thread related batch job.

* * * * *

UNITED STATES PATENT AND TRADEMARK OFFICE
CERTIFICATE OF CORRECTION

PATENT NO. : 5,504,898

DATED : April 2, 1996

INVENTOR(S) : Paul Klein

It is certified that error appears in the above-identified patent and that said Letters Patent is hereby corrected as shown below:

Column 6, line 58, "22" should read --26--.
Column 7, line 47, "of" should read --off--.
Column 12, line 33, "can÷t" should read --can't--.
Column 12, line 53, "Mold" should read --Hold--.
Column 15, line 1, "by" should read --be--.
Column 18, line 32, "NewUesr," should read --*NewUser,--.
Column 22, line 36, "*NewUesr," should read --*NewUser,--.

Signed and Sealed this

Twenty-sixth Day of November 1996

Attest:

BRUCE LEHMAN

*Attesting Officer*    *Commissioner of Patents and Trademarks*